(12) United States Patent
Yuan et al.

(10) Patent No.: US 10,990,743 B2
(45) Date of Patent: Apr. 27, 2021

(54) CREATING GATEWAY MODEL ROUTING SUB-TEMPLATES

(71) Applicant: Synopsys, Inc., Mountain View, CA (US)

(72) Inventors: Song Yuan, Xiamen (CN); Chao-Min Wang, Hsinchu (TW); Hsin-Po Wang, Hsinchu (TW)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/302,594

(22) PCT Filed: May 18, 2017

(86) PCT No.: PCT/US2017/033415
§ 371 (c)(1),
(2) Date: Nov. 16, 2018

(87) PCT Pub. No.: WO2017/201343
PCT Pub. Date: Nov. 23, 2017

(65) Prior Publication Data
US 2019/0294751 A1    Sep. 26, 2019

Related U.S. Application Data

(60) Provisional application No. 62/338,455, filed on May 18, 2016.

(51) Int. Cl.
*G06F 30/394*  (2020.01)
*G06F 30/398*  (2020.01)
*G06F 119/18*  (2020.01)

(52) U.S. Cl.
CPC .......... *G06F 30/394* (2020.01); *G06F 30/398* (2020.01); *G06F 2119/18* (2020.01)

(58) Field of Classification Search
USPC ........................................................ 716/126
See application file for complete search history.

(56) References Cited

U.S. PATENT DOCUMENTS

| 5,535,292 A | 7/1996 | Ranganathan et al. |
| 7,779,379 B2 | 8/2010 | Tai et al. |

(Continued)

FOREIGN PATENT DOCUMENTS

WO    WO 2017/201343 A1    11/2017

OTHER PUBLICATIONS

WIPO Application No. PCT/US2017/033415, PCT International Preliminary Report on Patentability dated Nov. 20, 2018.

(Continued)

*Primary Examiner* — Mohammed Alam
(74) *Attorney, Agent, or Firm* — Alston & Bird LLP

(57) ABSTRACT

A computer implemented method for routing a multitude of conductors through a first routing area on a planar surface is presented. The method includes receiving data representing the first routing area bounded by two opposite longitudinal sides each having a different number of a multitude of first vertices. The first routing area includes one or more blockages. The method further includes determining one or more locations on at least one of the two opposite longitudinal sides for adding one or more second vertices, and decomposing the first routing area into a multitude of second routing areas each not including any of the one or more blockages. The method further includes performing a gateway model routing (GMR) of the multitude of conductors in each of the multitude of second routing areas using the multitude of first vertices and the added one or more second vertices.

42 Claims, 14 Drawing Sheets

(56) References Cited

U.S. PATENT DOCUMENTS

| | | | |
|---|---|---|---|
| 8,990,756 B2 | 3/2015 | Wang et al. | |
| 9,269,189 B1 | 2/2016 | Marinov et al. | |
| 2001/0018759 A1* | 8/2001 | Andreev | G06F 30/394 |
| | | | 716/129 |
| 2005/0022149 A1 | 1/2005 | Smith et al. | |
| 2007/0288878 A1* | 12/2007 | Tai | G06F 30/394 |
| | | | 716/126 |
| 2014/0143747 A1* | 5/2014 | Wang | G06F 30/394 |
| | | | 716/129 |
| 2014/0320515 A1* | 10/2014 | Yanagisawa | G01C 21/32 |
| | | | 345/589 |
| 2015/0117859 A1 | 4/2015 | Backman | |
| 2015/0142300 A1* | 5/2015 | Tsirkin | G01C 21/3415 |
| | | | 701/410 |
| 2015/0193939 A1 | 7/2015 | Gurman | |
| 2019/0294751 A1* | 9/2019 | Yuan | G06F 30/394 |

OTHER PUBLICATIONS

WIPO Application No. PCT/US2017/033415, PCT International Search Report and Written Opinion of the International Searching Authority dated Aug. 11, 2017.

* cited by examiner

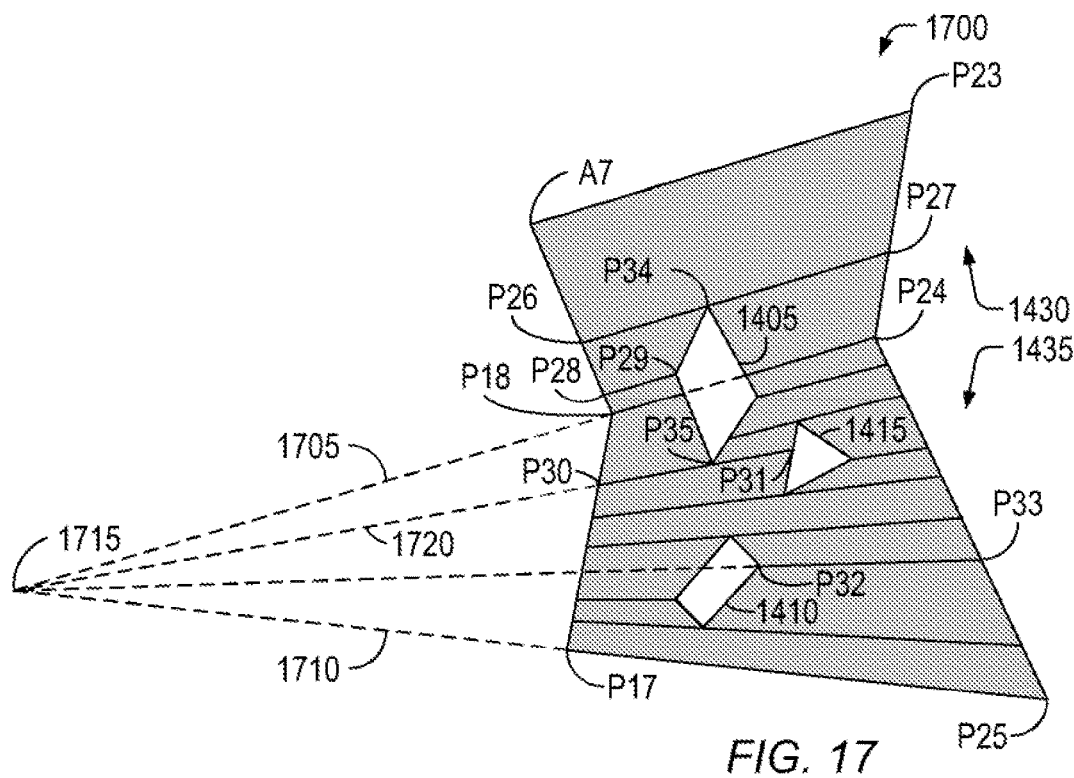
FIG. 17
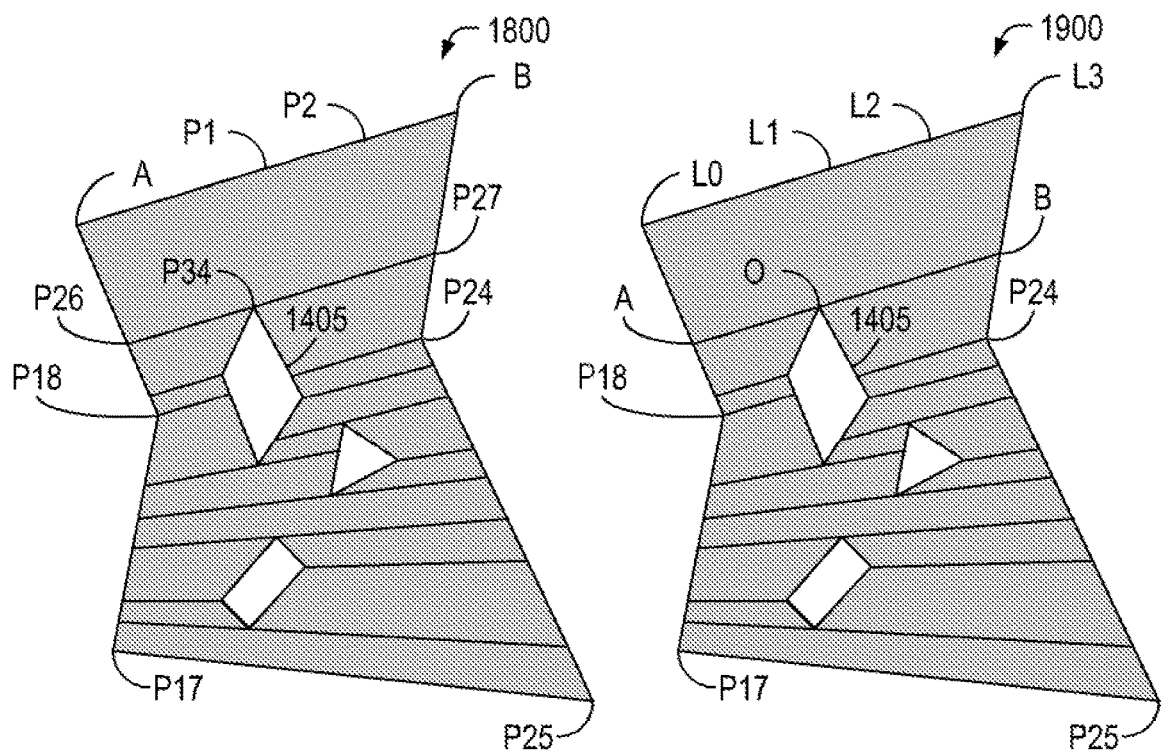
FIG. 18
FIG. 19

CREATING GATEWAY MODEL ROUTING SUB-TEMPLATES

CROSS-REFERENCES TO RELATED APPLICATIONS

This is a U.S. National Phase application, under 35 U.S.C. § 371, of PCT/US2017/033415, entitled "CREATING GATEWAY MODEL ROUTING SUB-TEMPLATES", filed on May 18, 2017, and claims priority, under 35 U.S.C. § 119(e), from U.S. Provisional Application No. 62/338,455, filed on May 18, 2016, entitled "CREATING GMR SUB-TEMPLATES", the contents of all of which is incorporated herein by reference in their entirety. This application is related to commonly assigned U.S. Pat. No. 7,779,379, entitled "TEMPLATE-BASED GATEWAY MODEL ROUTING SYSTEM", filed Jun. 11, 2007, and commonly assigned U.S. Pat. No. 8,990,756, entitled "GATEWAY MODEL ROUTING WITH SLITS ON WIRES", filed Nov. 21, 2013, the contents of all of which are herein incorporated by reference in their entirety.

BACKGROUND

The present invention relates to electronic design automation (EDA), and more particularly, to techniques for decomposing a gateway model routing (GMR) template of a planar layout, such as for a flat panel display (FPD), into a multitude of balanced sub-templates.

Computer aided design (CAD) tools called routers are used to automatically generate digital patterns corresponding to wire routes on planar surfaces. One such CAD technique is described in U.S. Pat. No. 7,779,379, by Wang, et al., which describes an automated way to route wires within a corridor region according to a GMR routing template. The routing template includes saved data that is associated with user specified constraints such as the shape and location of the corridor region, and wire routing constraints such as the locations of wire terminal or teeth edges, the width, spacing, alignment, resistance, and/or other attributes of the conductors.

In the original GMR template creation flow, a user may just select one start or end teeth edge to create the template with associated gateway segments. However, users should be careful to create a "balanced" GMR template, otherwise the action of GMR template creation may directly fail. "Balanced" means the opposite longitudinal sides, i.e. not the teeth edge sides, of a GMR template each have the same number of edges. The user may not be easily aware of the impending template creation failure due to the un-balanced template issue, especially in some corners of the template with small edges having changes in direction.

Another problem is that a user may be able to set only one routing mode or resistance constraint per GMR template. However, there may be some critical nets such as clocks or power/ground nets that should be routed in a pre-defined region of the template or with different constraints in order to ensure the proper associated signal integrity and/or specifications for those critical nets. To further complicate template creation, there may also be some blockage shapes that the wire routing may need to be detoured around. Therefore, known automated GMR template creation techniques may require arduous manual intervention.

Accordingly, there is a need to be able to automatically generate a balanced GMR template that also comprehends a multitude of constraint requirements each associated with different types of nets, while simultaneously routing around blockage shapes.

SUMMARY

According to one embodiment of the present invention, a computer implemented method for routing a multitude of conductors through a first routing area on a planar surface is presented. The method includes receiving, by the computer, data representing the first routing area bounded by two opposite longitudinal sides each having a different number of a multitude of first vertices when the computer is invoked to perform the routing. The first routing area includes one or more blockages. The method further includes determining, using the computer, one or more locations on at least one of the two opposite longitudinal sides for adding one or more second vertices, and decomposing, using the computer, the first routing area into a multitude of second routing areas each not including any of the one or more blockages. The method further includes performing, using the computer, a gateway model routing (GMR) of the multitude of conductors in each of the multitude of second routing areas using the multitude of first vertices and the added one or more second vertices.

According to one embodiment, the computer-implemented method further includes transforming the data representing the first routing area so that each one of the two opposite longitudinal sides includes an equal number of the multitude of first vertices plus the number of the added one or more second vertices. According to one embodiment, each of the multitude of first vertices and each of the one or more second vertices are not disposed at an end of one of the two opposite longitudinal sides. According to one embodiment, the computer-implemented method further includes separating the multitude of first vertices into a first multitude of vertices disposed on a first side of the two opposite longitudinal sides and into a second multitude of vertices disposed on a second side of the two opposite longitudinal sides, the first side being disposed opposite the second side.

According to one embodiment, the computer-implemented method further includes generating a first segment connected between one of the first multitude of vertices and one of the second multitude of vertices. The first segment is associated with a minimum angle between the first segment and at least one edge of one of the two opposite longitudinal sides that adjoins the first segment.

According to one embodiment, the computer-implemented method further includes generating a first segment connected between one of the first multitude of vertices and one of the second multitude of vertices. The first segment is immediately neighboring one of the first multitude of vertices that is closest to one of the second multitude of vertices.

According to one embodiment, the computer-implemented method further includes generating a first segment connected between one of the first multitude of vertices and one of the second multitude of vertices. The first segment is defined by a length that is less than twice the distance between one of the first multitude of vertices that is closest to one of the second multitude of vertices.

According to one embodiment, the computer-implemented method further includes generating a multitude of segments each one connected between a different pair of one of the first multitude of vertices and one of the second multitude of vertices. The method further includes finding at least one unconnected vertex of the multitude of first vertices that remains unconnected to any one of the multitude of segments previously generated. The at least one unconnected vertex is disposed on the first side. The method further includes adding the one or more second vertices to the second side, and generating a first segment connected between the at least one unconnected vertex and the one or more second vertices.

According to one embodiment, the first segment is disposed between but not intersecting an immediately adjacent pair of the multitude of segments previously generated. According to one embodiment, the first segment is associated with a gateway in accordance with the GMR. According to one embodiment, the one or more locations for adding the one or more second vertices is disposed in accordance with a first ratio of the length of a first edge and the length of a second edge. The at least one unconnected vertex is connected between the first edge and the second edge.

According to one embodiment, the first ratio is equal to a second ratio of the length of a third edge and a length of a fourth edge. The one or more second vertices is connected between the third edge and the fourth edge.

According to one embodiment, the decomposing is performed in accordance with a predetermined characteristic associated with one of the multitude of conductors. The multitude of conductors is associated with one of the multitude of second routing areas.

According to one embodiment, the decomposing is performed in accordance with a predetermined ratio of a first length of a first transverse side of one of the multitude of second routing areas to a second length of a second transverse side of another one of the multitude of second routing areas. The first transverse side and the second transverse side are collinear.

According to one embodiment, one of the one or more blockages is defined by a first multitude of vertices. The method further includes dividing a first portion of the first routing area in accordance with a position of at least one of the first multitude of vertices so as to form a transverse line segment that divides the first portion into a second portion and a third portion. The transverse line segment does not cross through an interior of any of the one or more blockages.

According to one embodiment, dividing the first portion of the first routing area forms a multitude of transverse line segments. Each one of the multitude of transverse line segments includes one point disposed at a different one of the first multitude of vertices. None of the multitude of transverse line segments crosses through an interior of any of the one or more blockages.

According to one embodiment, the first portion is bounded by a first transverse side and a second transverse side opposite the first transverse side. The transverse line segment is disposed parallel to the first transverse side when the second transverse side is disposed parallel to the first transverse side.

According to one embodiment, the first portion is bounded by a first transverse side and a second transverse side opposite the first transverse side. When a first collinear extension of the first transverse side intersects a second collinear extension of the second transverse side at a first point, then the transverse line segment is disposed such that a third collinear extension of the transverse line segment intersects the first point. According to one embodiment, a portion of the transverse line segment is a gateway during the GMR.

According to one embodiment, the computer-implemented method further includes dividing the second portion in accordance with one of the first multitude of vertices so as to form a longitudinal line segment that divides the second portion. A first end of the longitudinal line segment is disposed at one of the first multitude of vertices.

According to one embodiment, the computer-implemented method further includes dividing the second portion in accordance with a predetermined ratio of a first length of a first transverse side of one of the multitude of second routing areas to a second length of a second transverse side of another one of the multitude of second routing areas so as to form a longitudinal line segment that divides the second portion. The first transverse side and the second transverse side are collinear.

According to one embodiment of the present invention, a computer implemented method for routing a multitude of conductors through a routing area on a planar surface is presented. The method includes receiving, by the computer, data representing the routing area bounded by two opposite longitudinal sides each having a different number of a multitude of first vertices when the computer is invoked to perform the routing and determining, using the computer, one or more locations on at least one of the two opposite longitudinal sides for adding one or more second vertices. The method further includes performing, using the computer, a gateway model routing (GMR) of the multitude of conductors in the routing area using the multitude of first vertices and the added one or more second vertices.

According to one embodiment of the present invention, a computer-implemented method for routing a multitude of conductors through a first routing area on a planar surface is presented. The method includes receiving, by the computer, data representing the first routing area that includes one or more blockages when the computer is invoked to perform the routing, and decomposing, using the computer, the first routing area into a multitude of second routing areas each not including any of the one or more blockages. The method further includes performing, using the computer, a gateway model routing (GMR) in each of the multitude of second routing areas.

According to one embodiment of the present invention, a system for routing a multitude of conductors through a first routing area on a planar surface is presented. The system is configured to receive data representing the first routing area bounded by two opposite longitudinal sides each having a different number of a multitude of first vertices when the computer is invoked to perform the routing. The first routing area includes one or more blockages. The system is configured to determine one or more locations on at least one of the two opposite longitudinal sides for adding one or more second vertices, and decompose the first routing area into a multitude of second routing areas each not including any of the one or more blockages. The system is further configured to perform a gateway model routing (GMR) of the multitude of conductors in the first routing area using the multitude of first vertices and the added one or more second vertices.

According to one embodiment, the system is further configured to transform the data representing the first routing area so that each one of the two opposite longitudinal sides includes an equal number of the multitude of first vertices plus the number of the added one or more second vertices. According to one embodiment, the system is further configured to separate the multitude of first vertices into a first multitude of vertices disposed on a first side of the two opposite longitudinal sides and into a second multitude of vertices disposed on a second side of the two opposite longitudinal sides, the first side being disposed opposite the second side.

According to one embodiment, the system is further configured to generate a first segment connected between one of the first multitude of vertices and one of the second multitude of vertices. The first segment is associated with a minimum angle between the first segment and at least one edge of one of the two opposite longitudinal sides that adjoins the first segment.

According to one embodiment, the system is further configured to generate a first segment connected between one of the first multitude of vertices and one of the second multitude of vertices. The first segment is immediately neighboring one of the first multitude of vertices that is closest to one of the second multitude of vertices.

According to one embodiment, the system is further configured to generate a first segment connected between one of the first multitude of vertices and one of the second multitude of vertices. The first segment is defined by a length that is less than twice the distance between one of the first multitude of vertices that is closest to one of the second multitude of vertices.

According to one embodiment, the system is further configured to generate a multitude of segments each one connected between a different pair of one of the first multitude of vertices and one of the second multitude of vertices and find at least one unconnected vertex of the multitude of first vertices that remains unconnected to any one of the multitude of segments previously generated. The at least one unconnected vertex is disposed on the first side. The system is further configured to add the one or more second vertices to the second side, and generate a first segment connected between the at least one unconnected vertex and the one or more second vertices.

According to one embodiment, one of the one or more blockages is defined by a first multitude of vertices. The system is further configured to divide a first portion of the first routing area in accordance with a position of at least one of the first multitude of vertices so as to form a transverse line segment that divides the first portion into a second portion and a third portion. The transverse line segment does not cross through an interior of any of the one or more blockages.

According to one embodiment, the system is further configured to divide the second portion in accordance with one of the first multitude of vertices so as to form a longitudinal line segment that divides the second portion. A first end of the longitudinal line segment is disposed at one of the first multitude of vertices.

According to one embodiment, the system is further configured to divide the second portion in accordance with a predetermined ratio of a first length of a first transverse side of one of the multitude of second routing areas to a second length of a second transverse side of another one of the multitude of second routing areas so as to form a longitudinal line segment that divides the second portion. The first transverse side and the second transverse side are collinear.

According to one embodiment of the present invention, a computer implemented method for routing a multitude of conductors through a routing area on a planar surface is presented. The method includes receiving, by the computer, data representing the routing area bounded by two opposite longitudinal sides each having a different number of a multitude of first vertices when the computer is invoked to perform the routing, and determining, using the computer, one or more locations on at least one of the two opposite longitudinal sides for adding one or more second vertices. The method further includes performing, using the computer, a gateway model routing (GMR) of the multitude of conductors in the routing area using the multitude of first vertices and the added one or more second vertices.

According to one embodiment of the present invention, a computer-implemented method for routing a multitude of conductors through a first routing area on a planar surface is presented. The method includes receiving, by the computer, data representing the first routing area that includes one or more blockages when the computer is invoked to perform the routing, and decomposing, using the computer, the first routing area into a multitude of second routing areas each not including any of the one or more blockages. The method includes performing, using the computer, a gateway model routing (GMR) in each of the multitude of second routing areas.

A better understanding of the nature and advantages of the embodiments of the present invention may be gained with reference to the following detailed description and the accompanying drawings.

BRIEF DESCRIPTION OF THE DRAWINGS

FIG. 17 depicts the simplified exemplary layout of a portion of the third routing area previously depicted in FIG. 15 after dividing the portion of the third routing area with transverse line-segments, in accordance with one embodiment of the present invention.

FIG. 18 depicts the simplified exemplary layout of the tiles previously depicted in FIG. 17 after identifying vertices associated with a predetermined sub-templates ratio, in accordance with one embodiment of the present invention.

FIG. 19 depicts the simplified exemplary layout of the layout previously depicted in FIG. 18 after remarking vertices, in accordance with one embodiment of the present invention.

DETAILED DESCRIPTION

Figure 1:
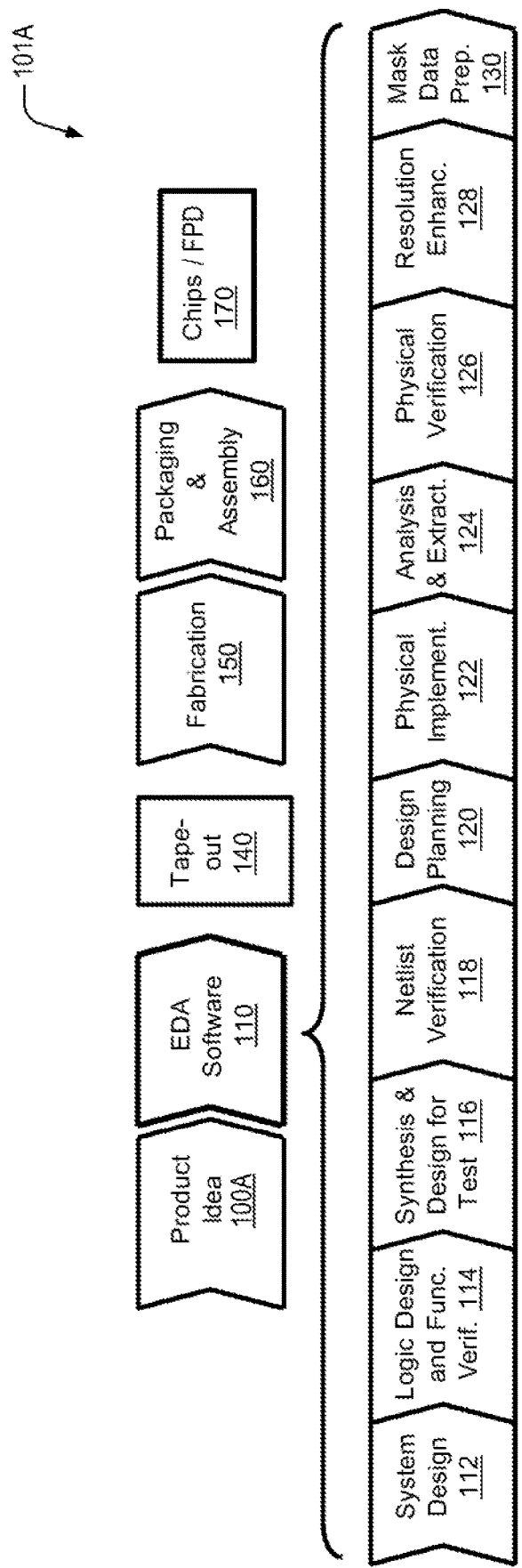
FIG. 1 depicts simplified exemplary steps in the design and fabrication of an integrated circuit (IC) or FPD.

FIG. 1 depicts simplified exemplary steps in the design and fabrication of an IC or FPD. The process starts with a product idea 100, which is realized using Electronic Design Automation (EDA) software 110. Chips or FPD 170 can be produced from the finalized design by performing fabrication 150 and packaging and assembly 160 steps. An exemplary design flow that uses EDA software 110 is described below for illustration purposes only. For example, an actual integrated circuit design may require a designer to perform the design flow steps in a different sequence than the sequence described below.

In the system design 112, a designer describes the functionality to be implemented. The designer can also perform what-if planning to refine the functionality and to check costs. Further, hardware-software architecture partitioning can occur at this step. In the design and functional verification 114, a Hardware Description Language (HDL) design may be created and checked for functional accuracy.

In the synthesis and design 116, the HDL code can be translated to a netlist, which can be optimized for the target technology. Further, tests can be designed and implemented to check the finished chips. In the netlist verification 118, the netlist can be checked for compliance with timing constraints and for correspondence with the HDL code. In the design planning 120, an overall floor plan for the chip can be constructed and analyzed for timing and top-level routing. Next, in the physical implementation 122, placement and routing can be performed.

In the analysis and extraction 124, the circuit functionality can be verified at a transistor level. In the physical verification 126, the design can be checked to correct any functional, manufacturing, electrical, or lithographic issues. In the resolution enhancement 128, geometric manipulations can be performed on the layout to improve manufacturability of the design. Finally, in the mask data preparation 130, the design can be taped-out 140 for production of masks to produce finished chips. The embodiments of the present invention may be used, for example, at the step of physical implementation 122.

A computer-based routing tool, GMR enables a user to create and store a set of adjustable routing templates. Each template includes a set of corridor parameter values defining a planar routing space, hereinafter referred to as an area or corridor, through which an unspecified number of conductors may be routed. Each template also includes a set of routing constraint parameter values for controlling various attributes of conductors that may be routed through the corridor.

To create a plan for routing a particular set of conductors through a particular corridor, for example on a FPD such as an OLED panel, the user selects one of the routing templates and edits the templates parameters if necessary to adjust the shape of its defined routing corridor to match the shape of the available corridor in the OLED panel, or to alter one or more of the routing constraints imposed by the template. The user then directs the routing tool to automatically generate a plan for routing that particular number of conductors through the corridor on the OLED panel in a manner that satisfies the routing constraints imposed by the selected routing template. The conductors may be routed around one or more blockage areas included in the routing area as will be described in greater detail below.

Figure 2:
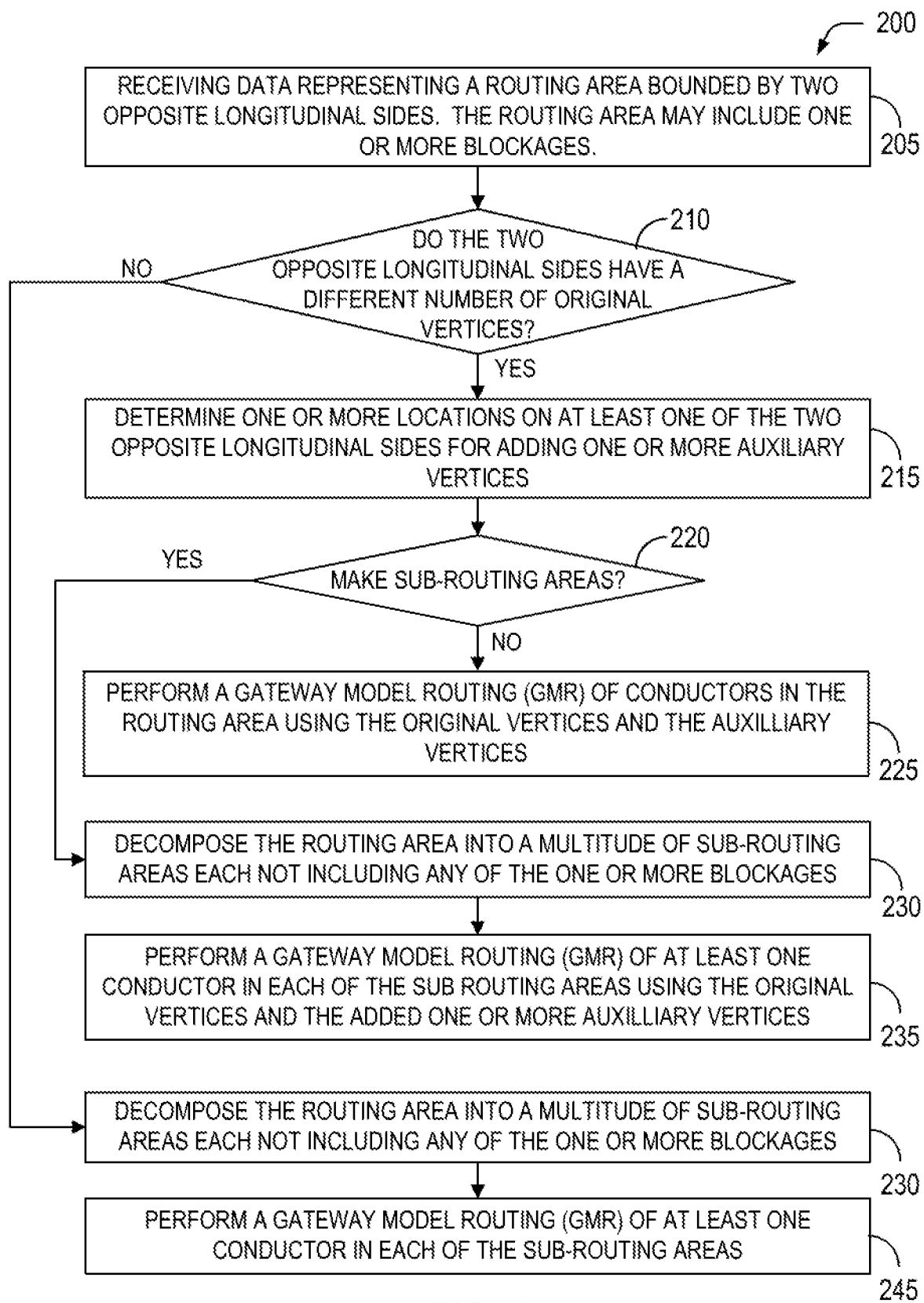
FIG. 2 depicts a simplified exemplary flow chart for routing a multitude of conductors through a routing area on a planar surface using an EDA tool, in accordance with one embodiment of the present invention.

FIG. 2 depicts a simplified exemplary flow chart 200 for routing a multitude of conductors through a routing area on a planar surface using an EDA tool, in accordance with one embodiment of the present invention. The planar surface may be an IC or FPD. Flow chart 200 includes the step of receiving, by computer system 2900 depicted in FIG. 29, data representing a routing area bounded by two opposite longitudinal sides when the computer is invoked to perform the routing. The routing area may include one or more blockages as will be described in greater detail below.

Figure 3:
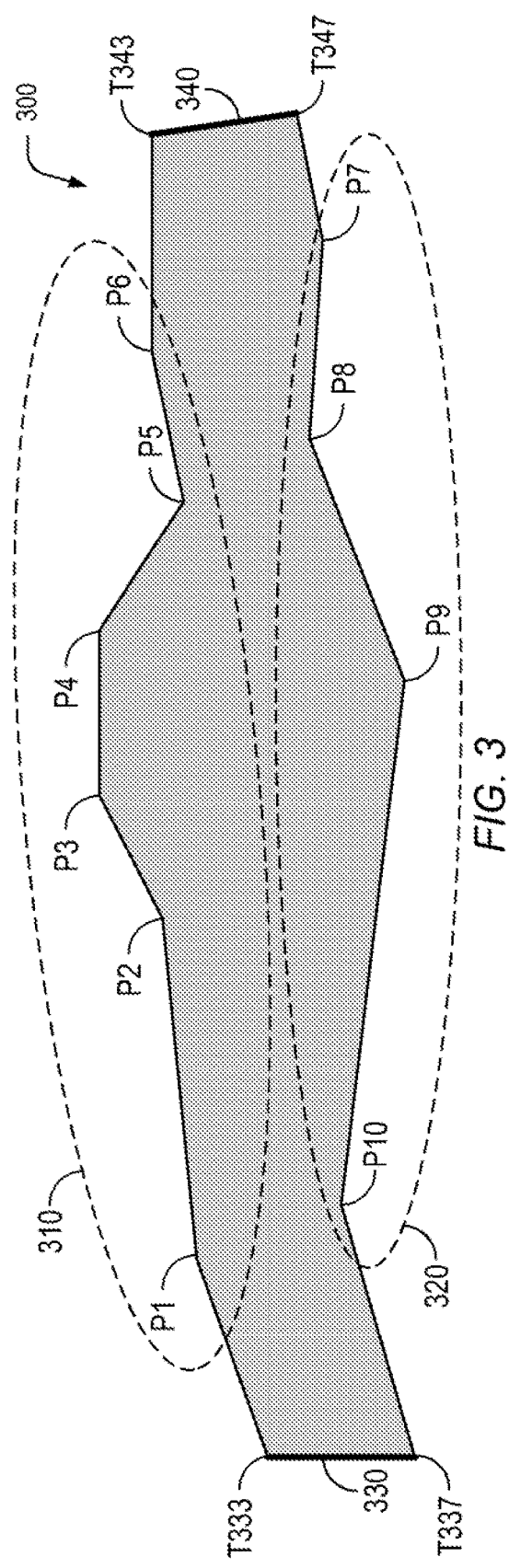
FIG. 3 depicts a simplified exemplary layout of a first routing area after separating the original vertices into two groups, in accordance with one embodiment of the present invention.

FIG. 3 depicts a simplified exemplary layout of a first routing area 300 after separating original vertices P1, P2-P10 into two groups of vertices 310, 320, in accordance with one embodiment of the present invention. First routing area 300 may be an irregular polygon as depicted, or a regular polygon with orthogonal boundary sides (not depicted). First routing area 300 may be defined by boundary edges, which in turn may be defined by corridor parameter values represented as points or original vertices P1, P2-P10. The boundary edges in this example include two opposite longitudinal sides and two opposite terminal edges called start teeth 330 and end teeth 340. Start teeth 330 and end teeth 340 each include locations called teeth for connecting the conductors routed inside the routing area to regions outside the routing area on the planar surface (see for example FIG. 28 and its associated description). Start teeth 330 includes two opposite ends, T333 and T337. Start teeth 330 includes two opposite ends, T343 and T347.

One of the two opposite longitudinal sides may include six original vertices P1-P6 and seven associated serially-connected boundary edges that include $\overline{T333P1}$, $\overline{P1P2}$, $\overline{P2P3}$, $\overline{P3P4}$, $\overline{P4P5}$, $\overline{P5P6}$, $\overline{P6T343}$. The other one of the two opposite longitudinal sides may include four original vertices P7-P10 and five associated serially-connected boundary edges that may include $\overline{T347P7}$, $\overline{P7P8}$, $\overline{P8P9}$, $\overline{P9P10}$, $\overline{P10T337}$.

In this context, the term "longitudinal" refers to the direction generally parallel to or along the lengthwise direction of conductors routed in first routing area 300. According to the GMR, the conductors in first routing area 300 will be routed in the longitudinal direction between the start teeth 330 and end teeth 340 boundaries and are not routed to cross the two opposite longitudinal sides. It is understood that different individual ones of the multitude of conductors that are routed inside first routing area 300 may take a zig-zagging or meandering path and are each connected only at their respective ends that are disposed at the start teeth 330 and end teeth 340 (see for example FIG. 28 and its associated description).

The example depicted in FIG. 3, where the longitudinal direction is roughly horizontal when FIG. 3 is right-reading, was chosen to be simple merely to better explain the embodiments. However, it is understood that routing areas with far more complex shapes, such as for example L-shaped or even U-shaped are able to use GMR. Accordingly, a longitudinal path or direction may take different angles depending on the shape of the routing area and the position along the routing path within the routing area. For example, for an L-shaped routing area, a longitudinal direction may be running roughly in the vertical direction along the upper part of the right reading L-shape, while the longitudinal direction may be running roughly in the horizontal direction along the bottom part of the right reading L-shape.

Referring simultaneously to FIGS. 2, 3, when 210 the data representing the routing area is bounded by two opposite longitudinal sides each side having a different number of a multitude of original vertices P1, P2-P10, which is true for first routing area 300, then first routing area 300 is not balanced, which in turn will cause problems during GMR. To prevent problems caused by a routing area that is not balanced, flow chart 200 will include a step to determine 215 one or more locations on at least one of the two opposite longitudinal sides for adding one or more auxiliary vertices as described in more detail below.

In one embodiment, each of the multitude of original vertices and each of the one or more auxiliary vertices are not disposed at an end of one of the two opposite longitudinal sides, i.e. T333, T337, T343, T347. In one embodiment, the data representing the routing area will be transformed so that each one of the two opposite longitudinal sides includes an equal number of the multitude of original vertices plus the number of the added one or more auxiliary vertices.

Accordingly, for first routing area 300, one could simply add two more auxiliary vertices to the opposite longitudinal side that includes the four original vertices P7-P10 to bring the total number of original plus auxiliary vertices to six and thus balancing first routing area 300. However, such this simplistic approach of adding all the auxiliary vertices to only one of the opposite longitudinal sides may produce a GMR result where conductors are forced to make undesirably sharp bends due to possible extreme gateway angles resulting from such an approach. In one embodiment, at least one of the auxiliary vertices may be added to each of the two opposite longitudinal sides in order to reduce the amount of bending in the routed conductors.

Figure 4:
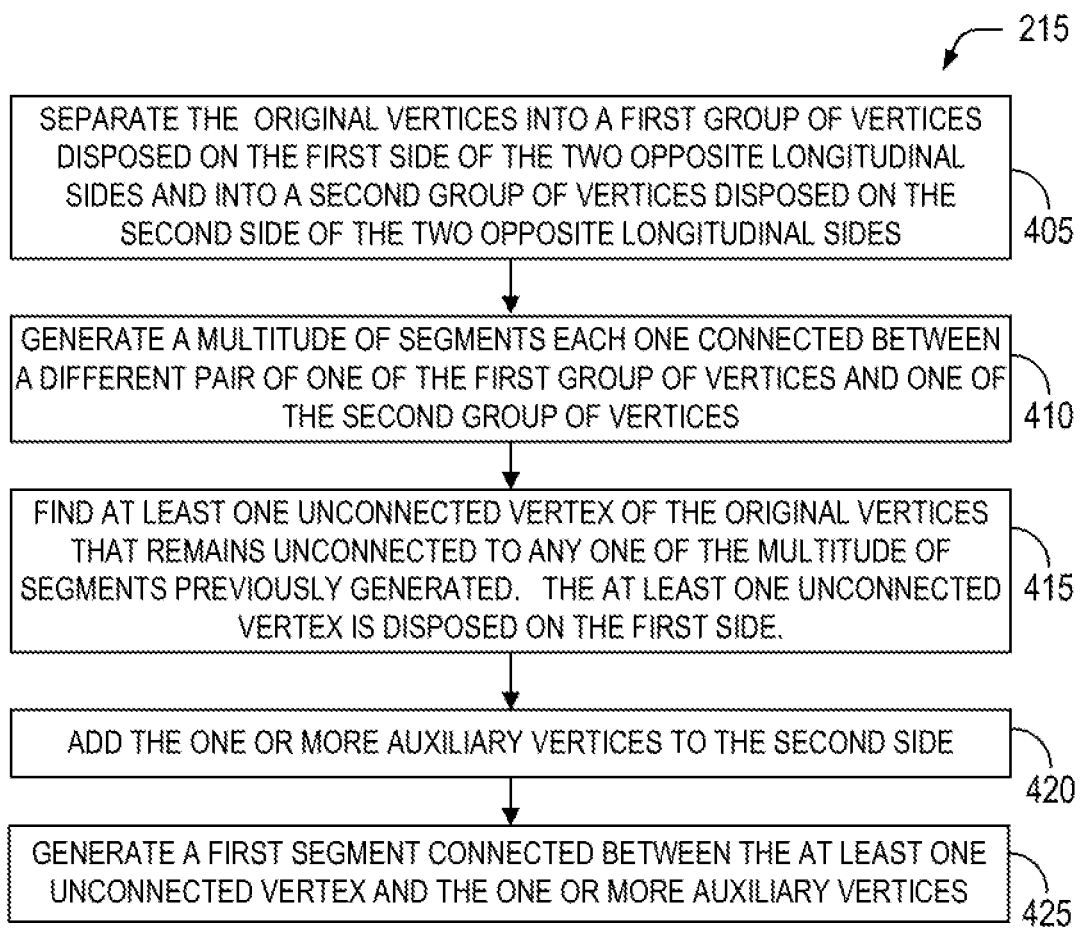
FIG. 4 depicts a simplified exemplary flow chart for determining the locations of auxiliary vertices as previously depicted in FIG. 2, in accordance with one embodiment of the present invention.

FIG. 4 depicts a simplified exemplary flow chart 215 for determining the locations of auxiliary vertices as previously depicted in FIG. 2, in accordance with one embodiment of the present invention. Referring simultaneously to FIGS. 3-4, flow chart 215 depicts the tool separates 405 original vertices P1, P2-P10 into a first group of vertices 310 disposed on the first side of the two opposite longitudinal sides and into a second group of vertices 320 disposed on the second side of the two opposite longitudinal sides. First group of vertices 310 may include original vertices P1, P2-P6. Second group of vertices 320 may include original vertices P7, P8-P10. Next, the tool generates 410 a multitude of segments each one connected between a different pair of one of the first group of vertices 310 and one of the second group of vertices 320, which is accomplished in the following steps. To start, the tool generates a first segment connected between one of the first group of vertices 310 and one of the second plurality of vertices 320, wherein the first segment is immediately neighboring one of the first plurality of vertices that is closest to one of the second plurality of vertices.

Figure 5:
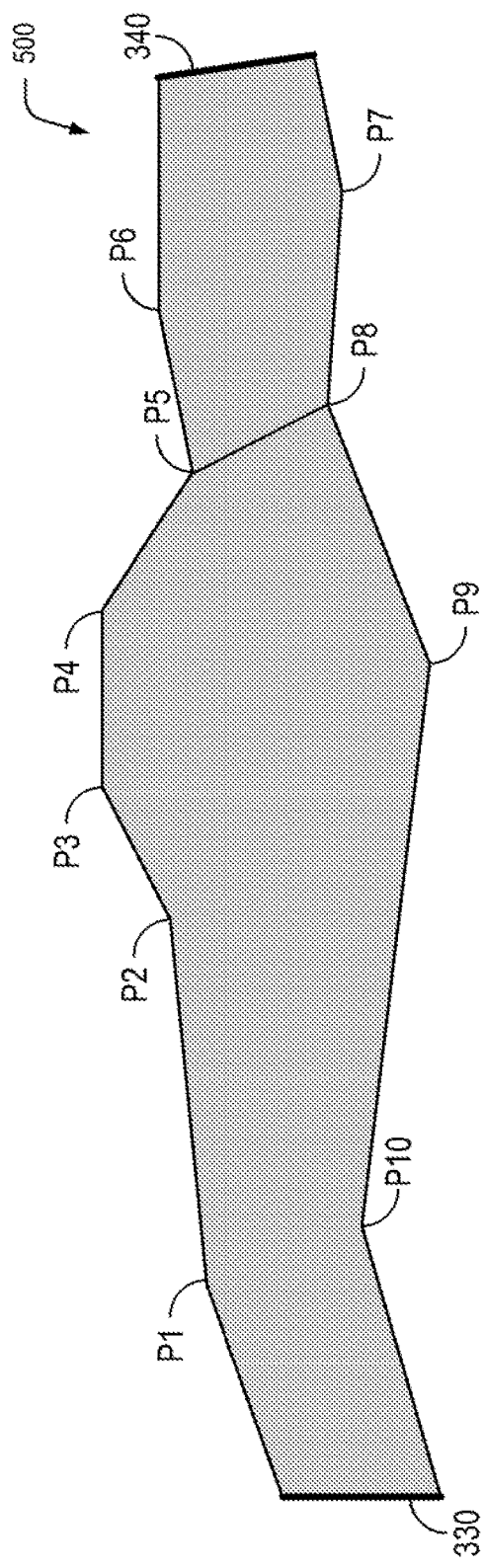
FIG. 5 depicts the simplified exemplary layout of the layout previously depicted in FIG. 3 after selecting a candidate transverse line-segment, in accordance with one embodiment of the present invention.

FIG. 5 depicts the simplified exemplary layout 500 of the first routing area 300 previously depicted in FIG. 3 after selecting a candidate transverse line-segment $\overline{P5P8}$, in accordance with one embodiment of the present invention. Layout 500 includes the same elements and functions as first routing area 300 with the following exceptions. The tool identifies one of the first group of vertices that is closest to one of the second group of vertices, in this example P5, P8 and then connects P5, P8 to form one segment $\overline{P5P8}$. The connection of segment $\overline{P5P8}$ as a segment may be temporary as explained below.

The term "transverse" in this context roughly means the direction crossing the routing area between the two opposite longitudinal sides or crossing the longitudinal direction. Accordingly, segment $\overline{P5P8}$ is an example of a candidate for a transverse line-segment. Transverse line-segments may become gateways for the GMR.

The corridor parameter values may define one or more "gateways", each extending across first routing area 300 between a pair of vertices, each one of the pair disposed on different opposite longitudinal sides of the routing area such that the gateways partition the corridor or routing area into a set of tiles. Gateways may hereinafter also be referred to as transverse line-segments. Gateways may include attributes similar to teeth that in-part control the routing of conductors that cross the gateway. In one embodiment, a portion of a transverse line segment may be a gateway during the GMR. For example, a continuous transverse line segment may be divided into a multitude of collinear transverse line segments each becoming a separate gateway for different sub-templates as described below in reference to FIGS. 20-28. In contrast, longitudinal line-segments are not gateways, but may be edges of GMR templates or sub-templates.

Figure 6:
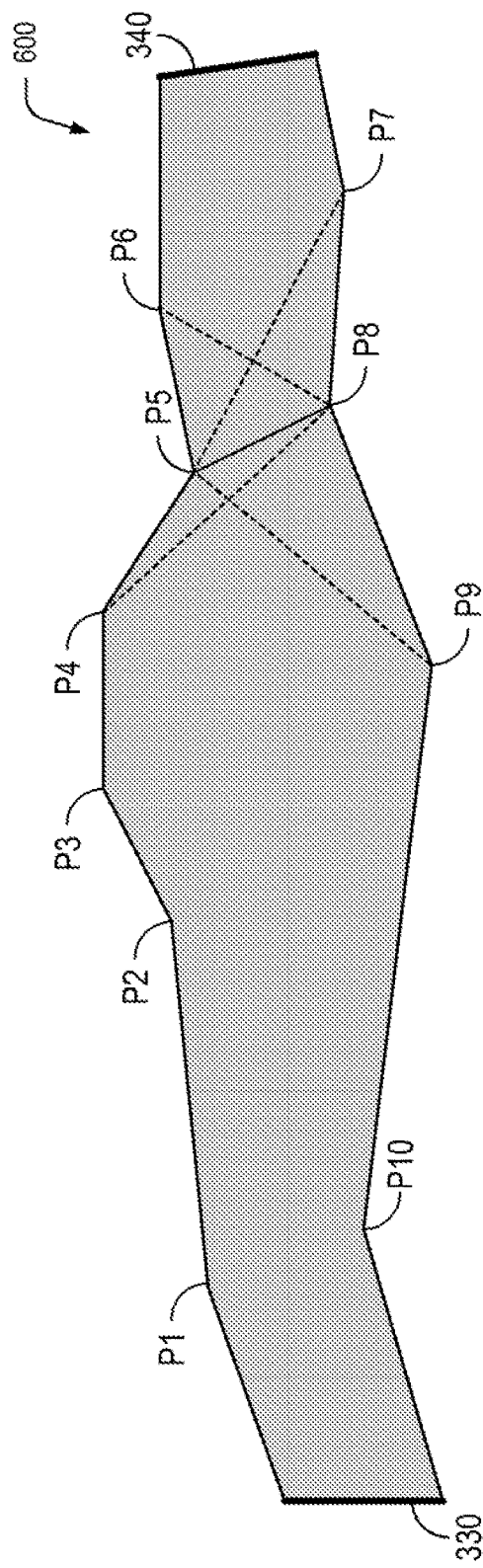
FIG. 6 depicts the simplified exemplary layout of the layout previously depicted in FIG. 5 after identifying a multitude of candidate transverse line-segments, in accordance with one embodiment of the present invention.

FIG. 6 depicts the simplified exemplary layout 600 of layout 500 previously depicted in FIG. 5 after identifying a multitude of candidate transverse line-segments, in accordance with one embodiment of the present invention. Layout 500 includes the same elements and functions as layout 500 with the following exceptions. The tool generates all the possible segments immediately neighboring segment $\overline{P5P8}$, which include segments $\overline{P5P9}$, $\overline{P5P7}$, $\overline{P8P4}$, and $\overline{P8P6}$. At this time, the tool has generated the candidates for a first permanent segment that will be used as a gateway connected between one of first group of vertices 310 and one of the second group of vertices 320. The candidate permanent segment is immediately neighboring one of the first group of vertices 310 that is closest to one of the second group of vertices 320.

Figure 7:
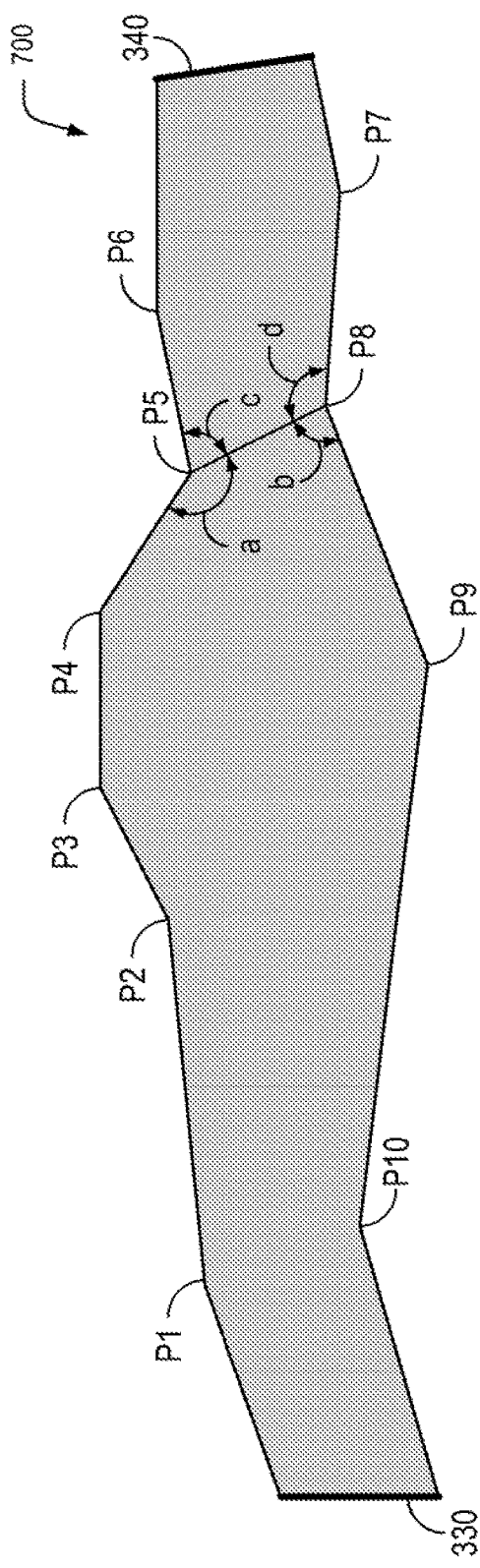
FIG. 7 depicts the simplified exemplary layout of the layout previously depicted in FIG. 6 after identifying angles associated with one of the multitude of candidate transverse line-segments, in accordance with one embodiment of the present invention.

FIG. 7 depicts the simplified exemplary layout 700 of layout 600 previously depicted in FIG. 6 after identifying angles associated with one of the multitude of candidate transverse line-segments, segment $\overline{P5P8}$, in accordance with one embodiment of the present invention. Layout 700 includes the same elements and functions as layout 600 with the following exceptions. For segment $\overline{P5P8}$ and for each of the segments immediately neighboring segment $\overline{P5P8}$, the tool separately calculates the four angles between each segment and each immediately adjoining edge to that associated segment. For example, selecting segment $\overline{P5P8}$, the angles are depicted as $\angle a$, $\angle b$, $\angle c$, and $\angle d$. For example, $\angle a$ is the angle between segment $\overline{P5P8}$ and edge $\overline{P4P5}$, $\angle b$ is the angle between segment $\overline{P5P8}$ and edge $\overline{P8P9}$, and so on.

Next, the tool selects one of the 5 segments above, e.g. segments $\overline{P5P8}$, $\overline{P5P9}$, $\overline{P5P7}$, $\overline{P4P8}$, $\overline{P6P8}$, as a first permanent segment that will be used as a gateway which satisfies the following two rules. The first rule is the length of the first permanent segment, $\overline{PxPy}$, should be less than twice the length of the shortest candidate segment, or $\overline{PxPy}<\overline{P5P8}*2$. In other words, the tool generates a first segment $\overline{PxPy}$ connected between one of the first group of vertices 310 and one of the second group of vertices 320, such that the first segment is defined by a length $\overline{PxPy}$ that is less than twice the distance between one of the first group of vertices 310 that is closest to one of the second plurality of vertices 320, e.g. segment $\overline{P5P8}$.

The second rule is the first permanent segment, $\overline{PxPy}$, should have min($\pi-\angle a-\angle b$, $\pi-\angle c-\angle d$). In other words, the tool generates a first segment $\overline{PxPy}$ connected between one of the first group of vertices 310 and one of the second group of vertices 320, such that first segment $\overline{PxPy}$ is associated with a minimum angle between the first segment and at least one edge of one of the two opposite longitudinal sides that adjoins first segment $\overline{PxPy}$. The only segment out of segments $\overline{P5P8}$, $\overline{P5P9}$, $\overline{P5P7}$, $\overline{P4P8}$, $\overline{P6P8}$ that satisfies the above two rules for first segment $\overline{PxPy}$ is $\overline{P6P8}$, which now becomes the first permanent transverse line-segment or gateway.

Figure 8:
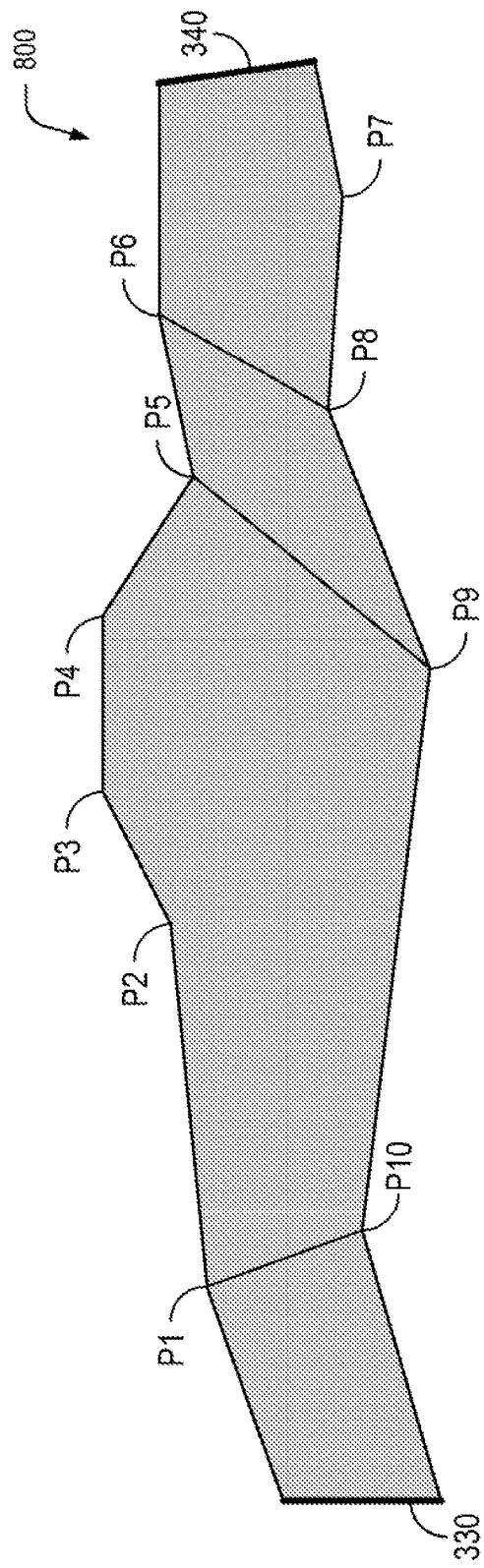
FIG. 8 depicts the simplified exemplary layout of the layout previously depicted in FIG. 7 after identifying a multitude of transverse line-segments, in accordance with one embodiment of the present invention.

FIG. 8 depicts the simplified exemplary layout 800 of layout 700 previously depicted in FIG. 7 after identifying a multitude of transverse line-segments, in accordance with one embodiment of the present invention. Layout 800 includes the same elements and functions as layout 700 with the following exceptions. The steps described above in reference to FIGS. 5-7 are repeated for the set of remaining unconnected vertices P1-P5, P7, P9-P10 until no unconnected vertex remains in one of the two groups of vertices 310, 320. For example, the next closest candidate segment out of the set of remaining unconnected vertices P1-P5, P7, P9-P10 is selected as a candidate for the next gateway and its neighbors are evaluated in similar fashion. Then, layout 800 includes permanent segment or gateway $\overline{P6P8}$ as determined in the first iteration of steps and permanent segments $\overline{P1P10}$, $\overline{P5P9}$ determined in the remaining iterations of steps.

It is noted that in first group of vertices 310 there remain at this time three unconnected vertices P2, P3, P4. In second group of vertices 320 there remains at this time one unconnected vertex P7. Vertex P7 was cut-off from connection to a gateway when gateway $\overline{P6P8}$ was created earlier.

Figure 9:
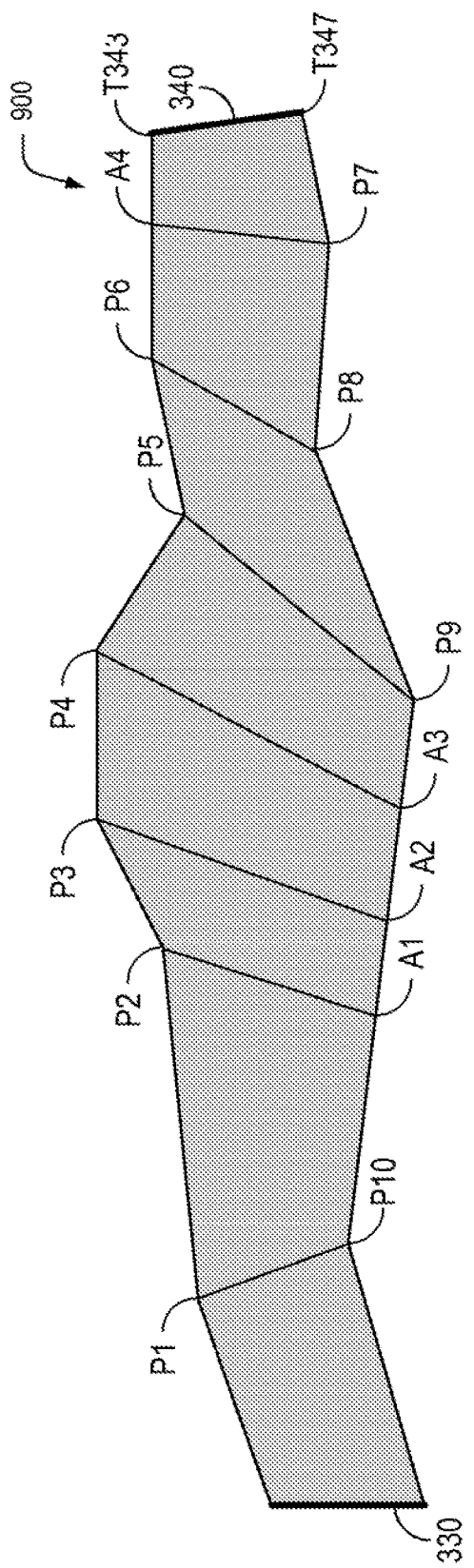
FIG. 9 depicts the simplified exemplary layout of the layout previously depicted in FIG. 8 after identifying a multitude of auxiliary points and additional transverse line-segments, in accordance with one embodiment of the present invention.

FIG. 9 depicts the simplified exemplary layout 900 of layout 800 previously depicted in FIG. 8 after identifying a multitude of auxiliary points A1-A4 and additional transverse line-segments $\overline{P2A1}$, $\overline{P3A2}$, $\overline{P4A3}$, $\overline{A4P7}$, in accordance with one embodiment of the present invention. Layout 900 includes the same elements and functions as layout 800 with the following exceptions. Referring simultaneously to FIGS. 4 and 8-9, flow chart 215 depicts the tool finds 415 at least one unconnected vertex, e.g. vertices P2, P3, P4, of the original vertices that remains unconnected to any one of the multitude of segments previously generated, e.g. $\overline{P6P8}$, $\overline{P1P10}$, $\overline{P5P9}$. The at least one unconnected vertex, e.g. P2-P4 is disposed on the first side of the two opposite longitudinal sides associated with first group of vertices 310. Then the tool adds 420 the one or more auxiliary vertices A1-A3 to the second side of the two opposite longitudinal sides associated with second group of vertices 320

Next, the tool generates 425 a first segment, e.g. $\overline{P2A1}$, connected between the at least one unconnected vertex P2 and the one or more auxiliary vertices A1, which is accomplished as follows. The one or more locations for adding the one or more auxiliary vertices A1-A3 is disposed on $\overline{P10P9}$ in accordance with a first ratio of the length of a first edge $\overline{P1P2}$, and the length of a second edge $\overline{P2P3}$, where the at least one unconnected vertex P2 is connected between the first edge $\overline{P1P2}$ and the second edge $\overline{P2P3}$. For the auxiliary vertices A1-A3, the one or more locations for adding the one or more auxiliary vertices A1-A3 is disposed on $\overline{P10P9}$ in accordance with a length ratio rule that matches the ratio of edge lengths on the two opposite longitudinal sides so that $\overline{P1P2}:\overline{P2P3}:\overline{P3P4}:\overline{P4P5}=\overline{P10A1}:\overline{A1A2}:\overline{A2A3}:\overline{A3P9}$. Similarly, A4 is added opposite P7 such that $\overline{P6A4}:\overline{A4T343}=\overline{P8P7}:\overline{P7T347}$. Accordingly, permanent segments or gateways $\overline{P2A1}$, $\overline{P3A2}$, $\overline{P4A3}$, $\overline{P7A4}$ are connected and completed.

Figure 10:
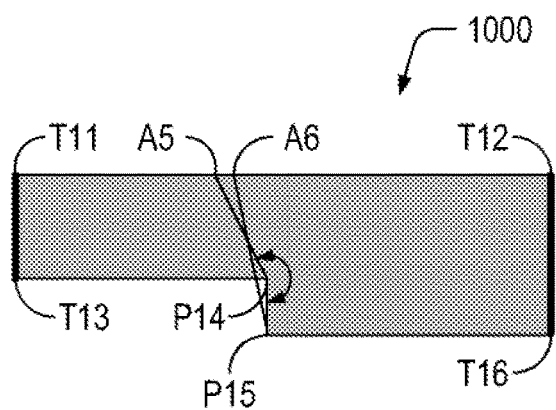
FIG. 10 depicts a simplified exemplary layout of a second routing area having problematic transverse line-segments, in accordance with one embodiment of the present invention.

FIG. 10 depicts a simplified exemplary layout of a second routing area 1000 having problematic transverse line-segments $\overline{A5P14}$, $\overline{A6P15}$, in accordance with one embodiment of the present invention. Second routing area 1000 is an example of how the above embodiments may generate an intersected gateway problem in some routing area configurations. Second routing area 1000 is bounded by two teeth edges $\overline{T11T13}$, $\overline{T12T16}$, boundary edges $\overline{T11A5}$, $\overline{A5A6}$, $\overline{A6T12}$ on a first side of the two opposite longitudinal sides, and boundary edges $\overline{T13P14}$, $\overline{P14P15}$, $\overline{P15T16}$ on a second side of the two opposite longitudinal sides of second routing area 1000.

In this example, the intersections of boundary edges $\overline{T13P14}$, $\overline{P14P15}$, $\overline{P15T16}$ form right angles. Second routing area 1000 is an example of how the above embodiments may generate an intersected gateway problem in some routing area configurations. Gateways $\overline{A5P14}$, $\overline{A6P15}$ are problematic because they cross or intersect due to the positions of auxiliary vertices A5, A6. The root cause of this intersection problem is that the angle ∠A5P14P15 is greater than 180 degrees and the angle of ∠P14P15A6 is invalid because $\overline{A6P15}$ extends outside second routing area 1000. Series of post-processing steps described below may be used to solve the above intersection problem.

Figure 11:
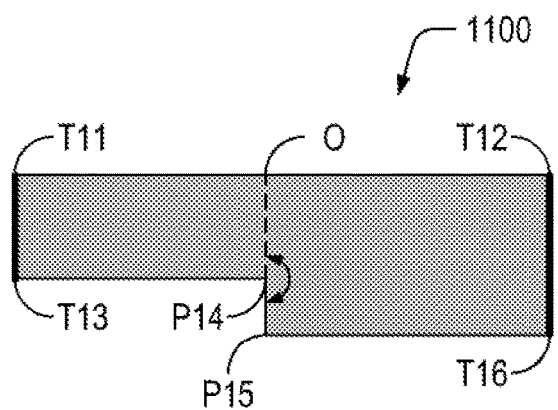
FIG. 11 depicts a simplified exemplary layout of the second routing area previously depicted in FIG. 10 after a first step to solve the problematic transverse line-segment problem, in accordance with one embodiment of the present invention.

FIG. 11 depicts a simplified exemplary layout 1100 of second routing area 1000 previously depicted in FIG. 10 after a first step to solve the problematic transverse line-segment problem, in accordance with one embodiment of the present invention. Layout 1100 includes the same elements and functions as second routing area 1000 with the following exceptions. The tool first extends segment $\overline{P14P15}$ to form collinear segment $\overline{P14O}$ where point O is on original edge $\overline{T11T12}$. Then the angle ∠OP14P15 is equal to 180 degrees.

Figure 12:
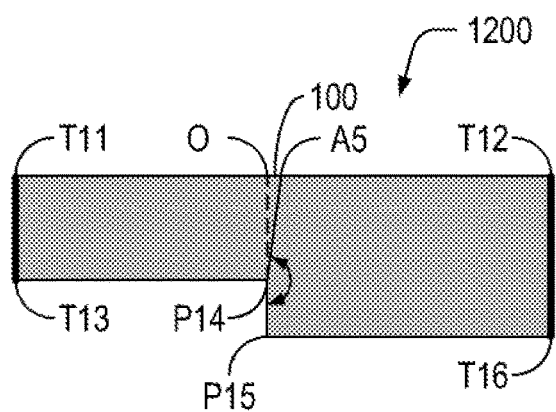
FIG. 12 depicts a simplified exemplary layout of the layout previously depicted in FIG. 11 after moving the shorter of the problematic transverse line-segments, in accordance with one embodiment of the present invention.

FIG. 12 depicts a simplified exemplary layout 1200 of layout 1100 previously depicted in FIG. 11 after moving the shorter of the problematic transverse line-segments, in accordance with one embodiment of the present invention. Layout 1200 includes the same elements and functions as layout 1100 with the following exceptions. Auxiliary vertex A5 has been moved by the tool one minimum layout unit to the right of point O on original edge $\overline{T11T12}$. Then, the angle ∠A5P14P15 is less than 180 degrees. The new permanent gateway $\overline{A5P14}$ is then connected using the new position of A5.

Figure 13:
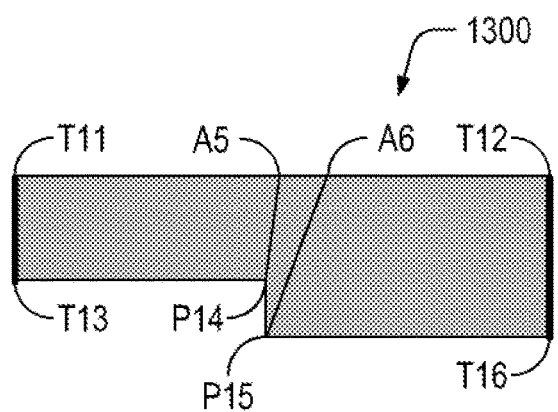
FIG. 13 depicts a simplified exemplary layout of the layout previously depicted in FIG. 12 after moving the longer of the problematic transverse line-segments and solving the previous problems, in accordance with one embodiment of the present invention.

FIG. 13 depicts a simplified exemplary layout 1300 of layout 1200 previously depicted in FIG. 12 after moving the longer of the problematic transverse line-segments $\overline{A6P15}$ and solving the previous problems, in accordance with one embodiment of the present invention. Layout 1300 includes the same elements and functions as layout 1200 with the following exceptions. Next the tool calculates a new position for A6 on original edge $\overline{T11T12}$ in accordance with the length ratio rule $\overline{A5A6}:\overline{A6T12}=\overline{P14P15}:\overline{P15T16}$. The new permanent gateway $\overline{A6P15}$ is then connected using the new position of A5. The result of the above post-processing sequence of steps eliminates the original crossing gateways problem in second routing area 1000.

Referring simultaneously to FIGS. 2 and 9, the above embodiments have completed the determining 215 step. Next, if 220 it is not desired to make sub-routing areas, then the tool performs 225 a gateway model routing (GMR) of conductors in first routing area 300 using the original vertices P1-P10 and the auxiliary vertices A1-A4 (see description referencing FIG. 28 below). However, if 220 it is desired to make sub-routing areas, then the tool decomposes 230 the routing area into a multitude of sub-routing areas each not including any of the one or more blockages as depicted using another routing area example. In this context, sub-routing areas may be associated with sub-templates as will be explained in reference to FIG. 27 described below.

Figures 14, 15:
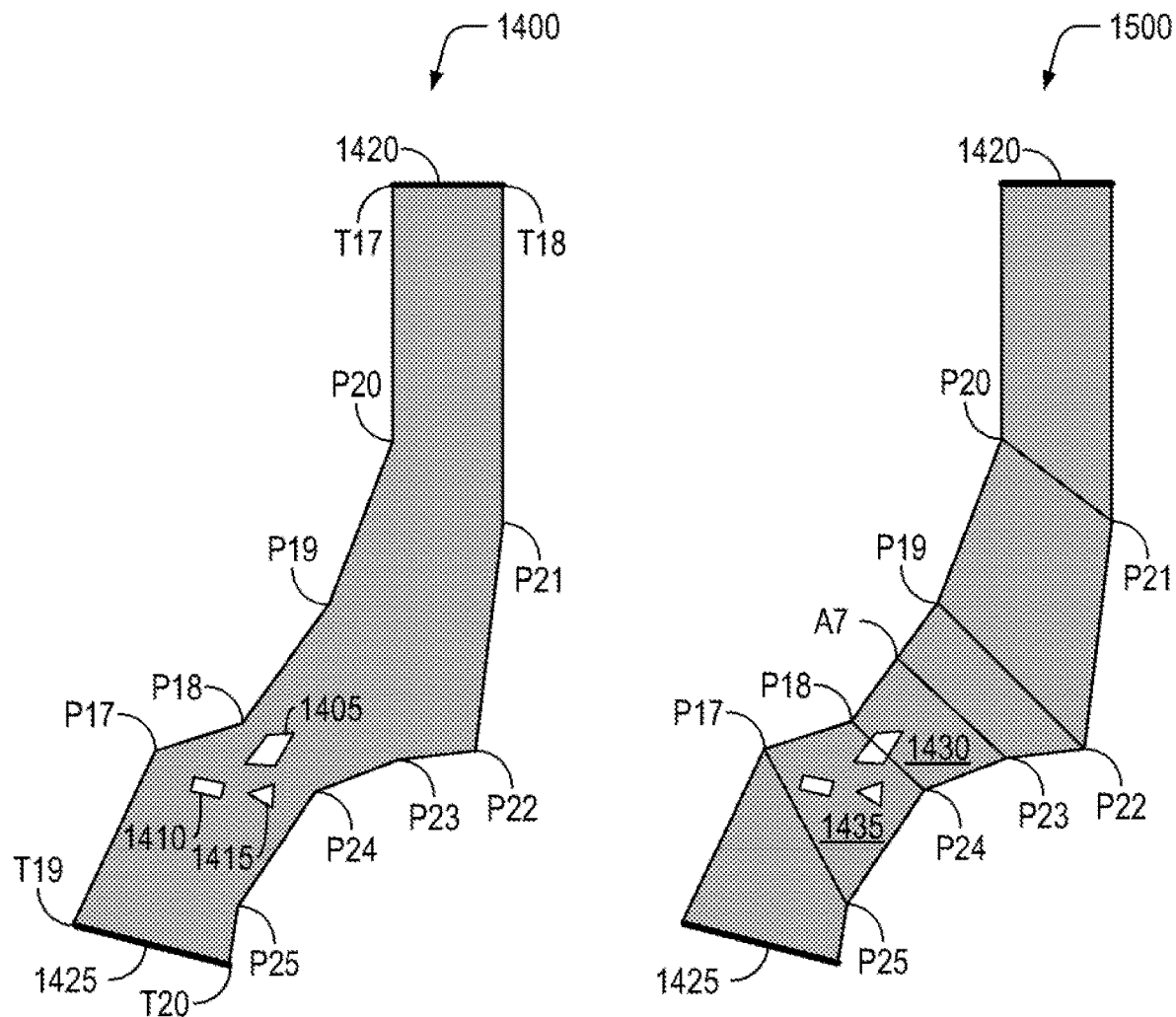
FIG. 14 depicts a simplified exemplary layout of a third routing area that includes a multitude of blockage shapes, which may be used by embodiments of the present invention.
FIG. 15 depicts the simplified exemplary layout of the third routing area previously depicted in FIG. 14 after balancing, in accordance with one embodiment of the present invention.

FIG. 14 depicts a simplified exemplary layout of a third routing area 1400 that includes a multitude of blockage area 1405, 1410, 1415, which may be operated upon by embodiments of the present invention. Third routing area 1400 is bounded by start teeth 1420, end teeth 1420, five boundary edges $\overline{T19P17}$, $\overline{P17P18}$, $\overline{P18P19}$, $\overline{P19P20}$, $\overline{P20T17}$ on a first side of the two opposite longitudinal sides, and six boundary edges $\overline{T18P21}$, $\overline{P21P22}$, $\overline{P22P23}$, $\overline{P23P24}$, $\overline{P24P25}$, $\overline{P25T20}$ on a second side of the two opposite longitudinal sides of third routing area 1400. Because the two opposite longitudinal sides of third routing area 1400 have different numbers of edges and original vertices, third routing area 1400 is not balanced.

FIG. 15 depicts the simplified exemplary layout 1500 of the third routing area 1400 previously depicted in FIG. 14 after balancing, in accordance with one embodiment of the present invention. Layout 1500 includes the same elements and functions as third routing area 1400 with the following exceptions. Because third routing area 1400 is not balanced, the embodiments referenced in FIGS. 2-13 are applied to balance third routing area 1400 so that a GMR may later be applied without problems. It is noted that the balancing procedure adds one auxiliary vertex A7 on $\overline{P18P19}$ so as to form segments or gateways $\overline{P18A7}$, $\overline{A7P19}$, which makes the number of vertices and edges equal between the two opposite longitudinal sides and thus balancing third routing area 1400 as layout 1500 depicts. Layout 1500 includes transverse line segments $\overline{P17P25}$, $\overline{P18P24}$, $\overline{A7P23}$, $\overline{P19P22}$, $\overline{P20P21}$ on that will all become gateways during GMR.

It is further noted that layout 1500 is divided by the multitude of gateways into a multitude of tiles including tiles 1430, 1435, which each include blockage areas. Tile 1430 is characterized by vertices P18, A7, P23, P24. Tile 1435 is characterized by vertices P17, P18, P24, P25. The GMR of layout 1500 will need to prevent the router from routing any conductors through the blockages as will be described below. However, now that third routing area 1400 has been balanced as layout 1500, layout 1500 may be used to demonstrate forming sub-templates in accordance with the following embodiments of the invention.

Figure 16:
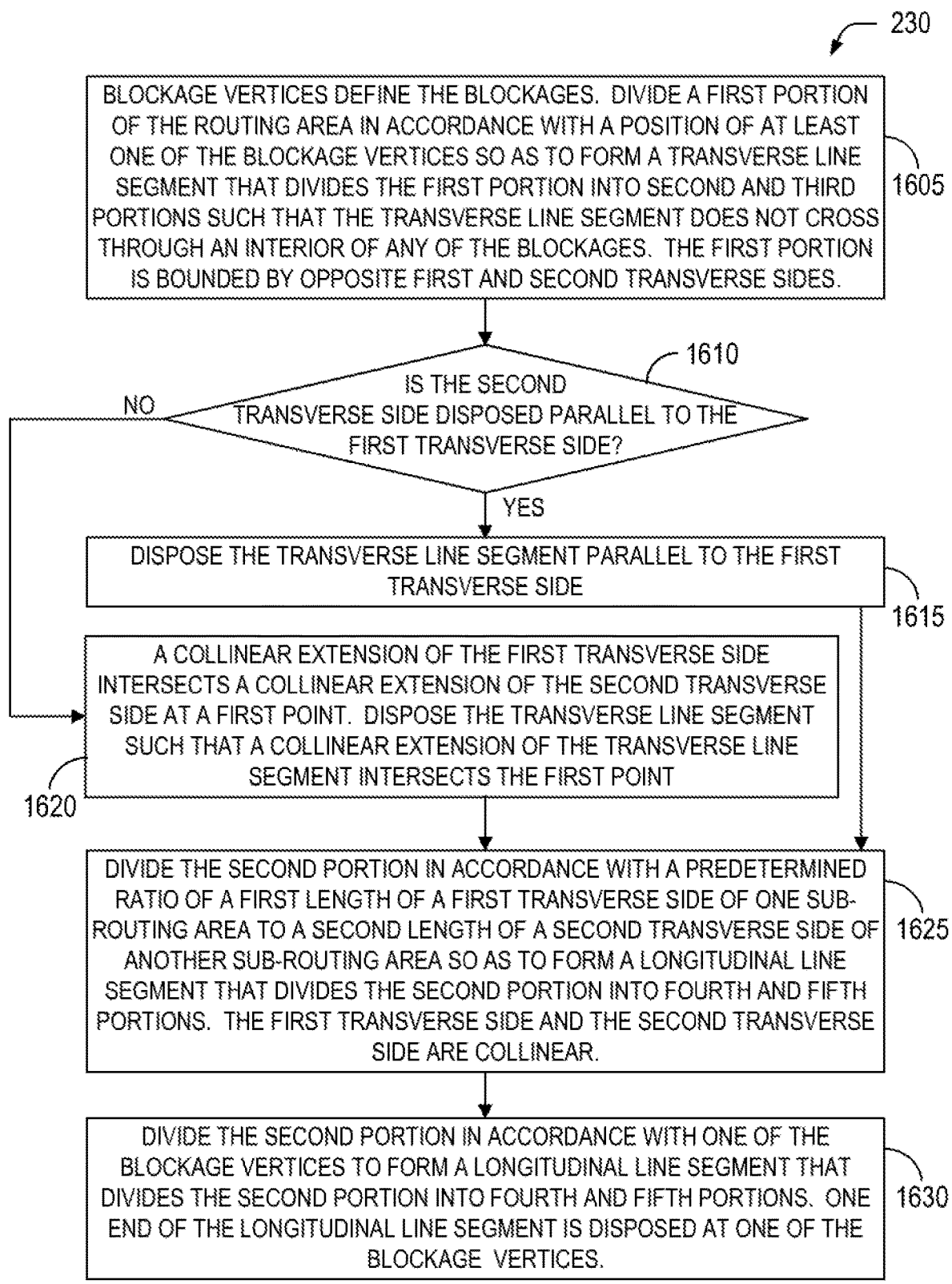
FIG. 16 depicts a simplified exemplary flow chart for decomposing the routing area into a multitude of sub-routing areas as previously depicted in FIG. 2, in accordance with one embodiment of the present invention.

FIG. 16 depicts a simplified exemplary flow chart 230 for decomposing the routing area into a multitude of sub-routing areas as previously depicted in FIG. 2, in accordance with one embodiment of the present invention. Referring simultaneously to FIGS. 14-16, flow chart 230 depicts that blockage vertices define blockage areas 1405, 1410, 1415.

FIG. 17 depicts the simplified exemplary layout 1700 of a portion, e.g. tiles 1430, 1435, of third routing area 1400, e.g. layout 1500, previously depicted in FIG. 15 after dividing the portion of the third routing area with a multitude of transverse line-segments, e.g. $\overline{P26P27}$, $\overline{P28P29}$, $\overline{P30P31}$, $\overline{P32P33}$, in accordance with one embodiment of the present invention. FIG. 17 depicts that blockage area 1405 is defined by a multitude of blockage vertices that include blockage vertices P29, P34, P35. It is noted that the shape of a blockage area that is supported by the tool is not restricted to any particular shape, orientation of shape, or number of defining vertices so long as the number of vertices is equal to or greater than three vertices.

Referring simultaneously to FIGS. 16-17, the tool divides 1605 a first portion, e.g. tile 1430, of the routing area, e.g. layout 1500, in accordance with a position of at least one of the blockage vertices, e.g. P29, P34 so as to form a transverse line segment, e.g. $\overline{P26P27}$, $\overline{P28P29}$, that divides the first portion, e.g. tile 1430, into a second portion, e.g. area characterized by vertices A7, P23, P27, P26, and a third portion, e.g. area characterized by vertices P28, P26, P34, P29, such that the transverse line segment $\overline{P28P29}$ does not cross through an interior of any of the blockages, e.g. blockage area 1405. The first portion, e.g. tile 1430, is bounded by opposite first and second transverse sides, e.g. $\overline{A7P23}$, $\overline{P18P24}$.

If 1610 the second transverse side $\overline{P18P24}$ is disposed parallel to first transverse side $\overline{A7P23}$, then transverse line segment, e.g. $\overline{P26P27}$, $\overline{P28P29}$, are disposed 1615 parallel to first transverse side $\overline{A7P23}$. The tool recognizes to trigger placement of transverse line segments $\overline{P26P27}$, $\overline{P28P29}$ because of the existence of associated blockage vertices P34, P29 respectively. In other words, dividing the first portion, e.g. tile 1430, of the routing area, e.g. layout 1500, forms a multitude of transverse line segments $\overline{P26P27}$, $\overline{P28P29}$, where each one of the multitude of transverse line segments $\overline{P26P27}$, $\overline{P28P29}$, includes one point disposed at a different one of the multitude of blockage vertices P34, P29. Further, none of the multitude of transverse line segments $\overline{P26P27}$, $\overline{P28P29}$ crosses through an interior of any of the one or more blockages 1405.

Accordingly, in one embodiment, original gateway $\overline{P18P24}$ may be split into two collinear segments as indicated by the dashed line in the middle of $\overline{P18P24}$ where $\overline{P18P24}$ overlaps blockage 1405. It is noted that transverse line segments $\overline{P26P27}$, $\overline{P28P29}$ are explicitly disposed by geometry since the tool places the vertices P26, P27, P28 on the opposite longitudinal sides of tile 1430 at the unique locations that form segments that start, end, or intersect at blockage vertices P34, P29 and that form segments that are parallel to first transverse side $\overline{A7P23}$.

Referring to tile 1435 in FIG. 17, if 1610 the transverse side $\overline{P18P24}$ is not disposed parallel to transverse side $\overline{P17P25}$, then by geometry a collinear extension 1705 of transverse side $\overline{P18P24}$ intersects a collinear extension 1710 of the transverse side $\overline{P17P25}$, at a point 1715. Then the tool disposes 1620 transverse line segment $\overline{P30P31}$ such that a collinear extension 1720 of transverse line segment $\overline{P30P31}$ intersects point 1715. Transverse line segment $\overline{P30P31}$ ends at blockage vertex P31 because transverse line segment $\overline{P30P31}$ may not cross into blockage 1415. It is noted that a transverse line segment may start on a side of a blockage opposite point 1715 such as at blockage vertex P32 associated with blockage area 1410, because each blockage vertex will have an associated transverse line segment, e.g. $\overline{P32P33}$. Accordingly, the framework for building the sub-templates is completed for the transverse direction when all the transverse line segments are made into gateways or terminal edges for GMR. The following embodiments will describe how the framework for building the sub-templates is done for the longitudinal direction.

Procedure #2.1. Referring to FIG. 15, The framework for building the sub-templates is done for the longitudinal direction by iteratively selecting and adding new vertices to different previously created terminal edges and transverse line segments to define where new longitudinal line segments will be added. If a selected terminal edge or transverse line segment does not intersect a blockage area, e.g. start teeth 1420, end teeth 1420, or transverse line segments $\overline{P17P25}$, $\overline{A7P23}$, $\overline{P19P22}$, $\overline{P20P21}$, then the following steps are performed. A predetermined number of sub-templates, e.g. three, and a predetermined sub-template ratio for the width in the transverse direction of those sub-templates, e.g. 2:1:1, is received by the tool, for example from the tool user or from another tool.

In one embodiment, the decomposing is performed in accordance with a predetermined characteristic associated with one of the multitude of conductors, which in turn is associated with one of the multitude of sub-routing areas. In other words, the tool may automatically generate the sub-template ratio information from the predetermined characteristics supplied to the tool such as the width and/or number of conductors in each sub-template that is used by the GMR. For example, the transverse width of a first sub-template that is supposed to route two very wide conductors such as power and ground line conductors may be automatically assigned a ratio value of 2. A second sub-template that is supposed to route only one medium wide conductor such as a clock signal line may be automatically assigned a ratio value of one and equal to the ration value for a third second sub-template that is supposed to route only one narrow conductor such as a digital signal line. Accordingly, the sub-template ratio is automatically generated within the tool as 2:1:1 for these two sub-templates (see description in reference to FIG. 28).

FIG. 18 depicts the simplified exemplary layout 1800 of the tiles 1430, 1435, previously depicted in FIG. 17 after identifying vertices associated with a predetermined sub-templates ratio, in accordance with one embodiment of the present invention. Layout 1800 includes the same elements and functions as layout 1700 with the following exceptions. Referring simultaneously to FIGS. 17 and 18, the tool selects transverse line segment $\overline{A7P23}$ to add vertices. Because the predefined number of sub-templates is three, the tool will add two additional vertices generalized in name as vertex P1 and vertex P2 (not to be confused with previously described vertices by the same name). Vertex A7 is generalized as vertex A and vertex P23 is generalized as vertex B.

Figure 20:
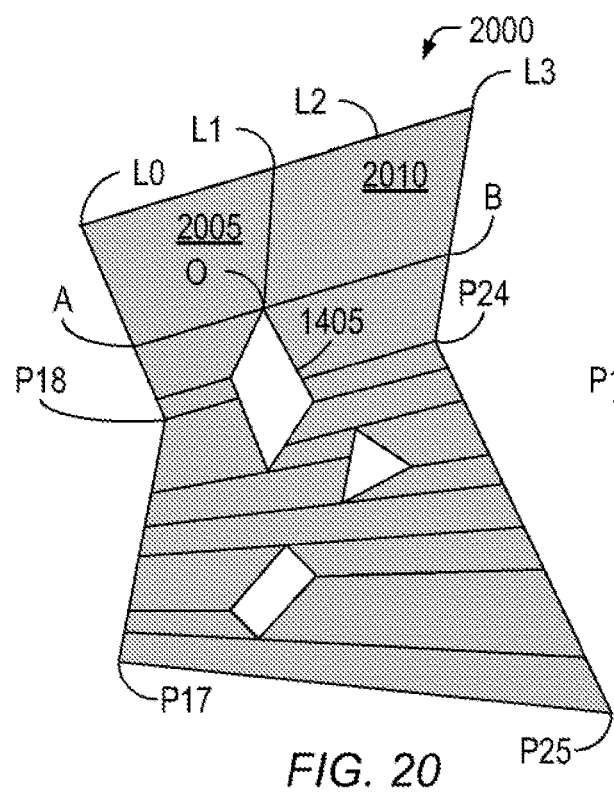
FIG. 20 depicts the simplified exemplary layout of the layout previously depicted in FIG. 19 after dividing the area portion with a longitudinal line-segment that ends at one of the multitude of blockages, in accordance with one embodiment of the present invention.

Referring simultaneously to FIGS. 16 and 18, flow chart 230 depicts the tool divides 1625 the second area portion, e.g. the area characterized by vertices A7, P23, P27, P26 in accordance with the predetermined sub-template ratio, e.g. 2:1:1, of a first length, e.g. 2 units, of a first transverse side of one sub-routing area, e.g. $\overline{AP1}$, to a second length, e.g. 1 unit, of a second transverse side of another sub-routing area, e.g. $\overline{P1P2}$, so as to form a longitudinal line segment that divides the second portion into fourth and fifth portions (depicted in FIG. 20). The first transverse side $\overline{AP1}$ and the second transverse side $\overline{P1P2}$ are collinear. In other words, P1 and P2 are added in transverse line segment $\overline{AB}$ and disposed in accordance with the predetermined sub-template ratio as defined by $\overline{AP1}:\overline{P1P2}:\overline{P2B}=2:1:1$.

FIG. 19 depicts the simplified exemplary layout 1900 of layout area 1800 previously depicted in FIG. 18 after remarking vertices A, P1, P2, B, in accordance with one embodiment of the present invention. Layout 1900 includes the same elements and functions as layout 1800 with the following exceptions. Referring simultaneously to FIGS. 18 and 19, layout 1900 includes the same elements and functions as layout 1800 with the following exceptions. The tool next remarks vertices A, P1, P2, B as L0, L1, L2, L3 respectively, and selects another transverse line segment, such as $\overline{P26P27}$ to evaluate.

Procedure #2.2. If a selected terminal edge or transverse line segment, e.g. $\overline{P26P27}$, is divided into at least two collinear transverse line segments, e.g. $\overline{P26P34}$, $\overline{P34P27}$, at a single blockage vertex P34, then the following steps are performed. Vertex P26 is generalized as vertex A, vertex P34 is generalized as vertex O and vertex P27 is generalized as vertex B. It is noted that transverse line segments $\overline{AB}$ and $\overline{L0L3}$ correspond to the same sub-templates because they can be connected without any blockage in an area characterized by vertices L0, L3, B, A (renamed from vertices A7, P23, P27, P26), but that still needs to be divided by a longitudinal line segment. Vertex O will be one dividing vertex for $\overline{AB}$. The longitudinal line segment $\overline{OLx}$ will be determined by the tool selecting one vertex Lx in the set {L0, L1, L2, L3} that satisfies the calculation; MINIMUM of ABS($\overline{L0Lx}/\overline{L0L3}-\overline{A0}/\overline{AB}$), which in this example selects Lx=L1.

Figure 21:
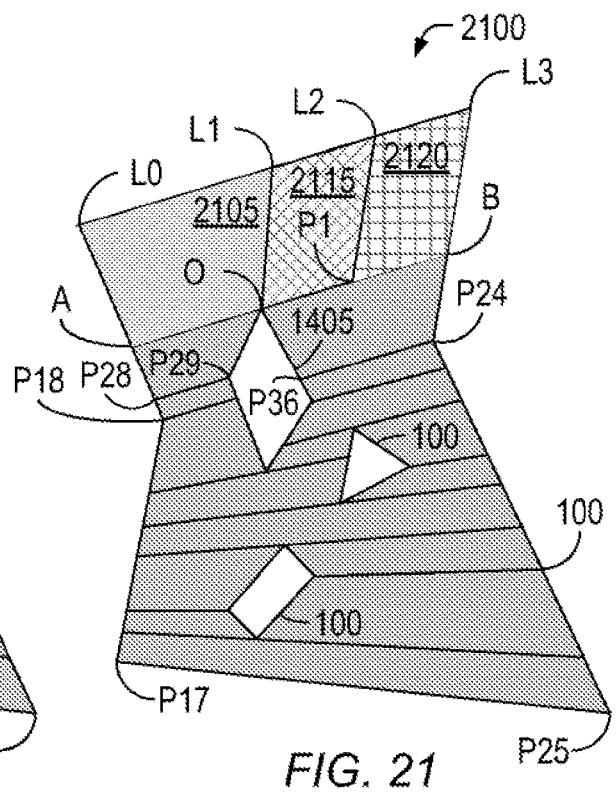
FIG. 21 depicts the simplified exemplary layout of the layout previously depicted in FIG. 20 after further dividing the area portion with another longitudinal line-segment according to the predetermined second ratio, in accordance with one embodiment of the present invention.

FIG. 20 depicts the simplified exemplary layout 2000 of layout 1900 previously depicted in FIG. 19 after dividing the second area portion characterized by vertices L0, L3, B, A (renamed from vertices A7, P23, P27, P26) with a longitudinal line-segment $\overline{OL1}$ that ends at one of the multitude of blockage vertices O, in accordance with one embodiment of the present invention. Layout 2000 includes the same elements and functions as layout 1900 with the following exceptions. Referring simultaneously to FIGS. 16 and 20, flow chart 230 depicts the tool divides 1630 the second area portion, e.g. the area characterized by vertices L0, L3, B, A, in accordance with one of the blockage vertices O to form a longitudinal line segment $\overline{OL1}$ that divides the second area portion into fourth and fifth area portions, e.g. area 2005, 2010 respectively. Area 2005 is characterized by vertices L0, L1, O, A, while area 2010 is characterized by vertices L1, L3, B, O. As mentioned above, one end of longitudinal line segment $\overline{OL1}$ is disposed at one of the blockage vertices O. In other words, FIG. 21 depicts the simplified exemplary layout 2100 of layout 2000 previously depicted in FIG. 20 after further dividing the second area portion characterized by vertices L0, L3, B, A (renamed from vertices A7, P23, P27, P26) with another longitudinal line-segment $\overline{P1L2}$, according to the predetermined second ratio, in accordance with one embodiment of the present invention. Referring simultaneously to FIGS. 20 and 21, layout 2100 includes the same elements and functions as layout 2000 with the following exceptions. For transverse line segment $\overline{OB}$, the tool uses the procedure described above where the predetermined sub-template ratio determines the disposition of a new vertex P1 on transverse line segment $\overline{OB}$ in accordance with the ratio $\overline{OP1}:\overline{P1B}=1:1$, for this example. In other words, the predetermined sub-template ratio is equal to a ratio of the length of an edge $\overline{OP1}$ and a length of an edge, $\overline{P1B}$, where the one or more vertices P1 is connected between the edge $\overline{OP1}$ and the edge $\overline{P1B}$.

It is noted that area 2005 may be assigned as a sub-tile in one sub-template 2105 of the three sub-templates in this example, as depicted in lighter solid grey fill pattern than the darker solid grey fill pattern in unassigned template areas such as area 2005. It is further noted that area 2010 is now divided into area 2115 and area 2120. Area 2115 may be assigned as a sub-tile in a second sub-template 2115 of the three sub-templates, as depicted by diagonally cross-hatched fill pattern. Area 2120 may be assigned as a sub-tile in a third sub-template 2120 of the three sub-templates, as depicted by horizontal/vertical checked cross-hatched fill pattern.

Figure 22:
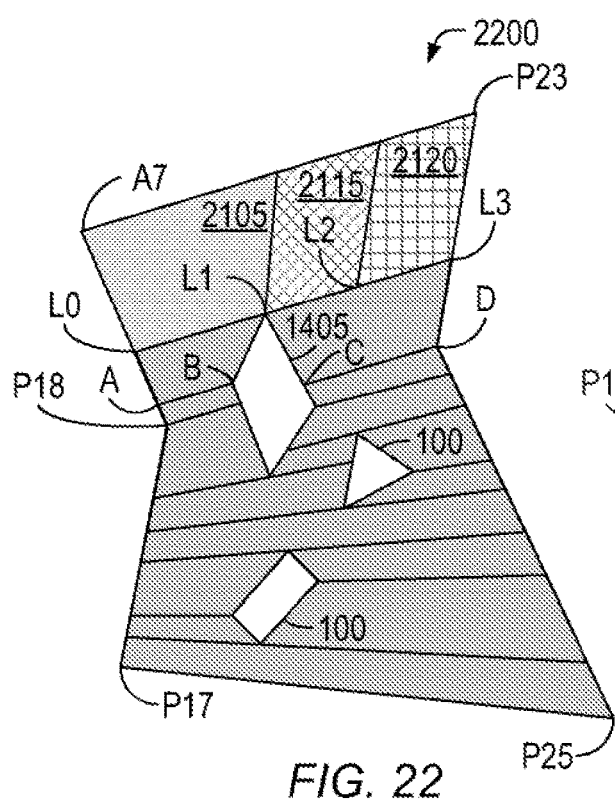
FIG. 22 depicts the simplified exemplary layout of the layout previously depicted in FIG. 21 after a second remarking of the area portion, in accordance with one embodiment of the present invention.

FIG. 22 depicts the simplified exemplary layout 2200 of layout 2100 previously depicted in FIG. 21 after a second remarking of the second area portion characterized by vertices L0, L3, B, A (renamed from vertices A7, P23, P27, P26), in accordance with one embodiment of the present invention. Referring simultaneously to FIGS. 21 and 22, layout 2200 includes the same elements and functions as layout 2100 with the following exceptions. The tool next remarks vertices A, O, P1, B as L0, L1, L2, L3 respectively, and selects the next transverse line segments to evaluate, such as $\overline{P28P29}$, $\overline{P36P24}$.

Procedure #2.3. If a selected terminal edge or transverse line segment is divided into at least two separated transverse line segments, e.g. $\overline{P28P29}$, $\overline{P36P24}$, by a blockage area 1405, then the following steps are performed. Vertices P28, P29, P36, P24 are generalized as associated vertices A, B, C, D respectively.

Figure 23:
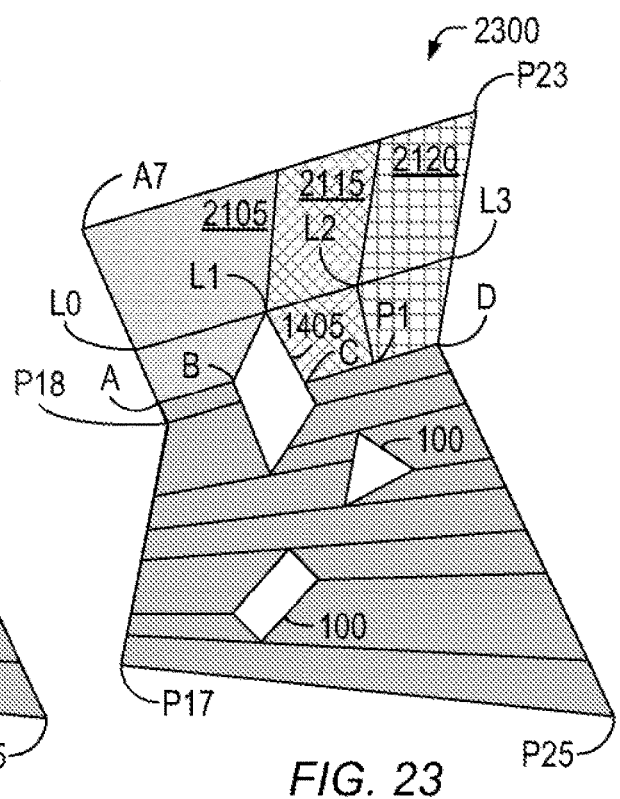
FIG. 23 depicts the simplified exemplary layout of the layout previously depicted in FIG. 22 after further dividing the second area portion with another longitudinal line-segments around a first blockage, in accordance with one embodiment of the present invention.

FIG. 23 depicts the simplified exemplary layout 2300 of layout 2200 previously depicted in FIG. 22 after further dividing the second area portion characterized by vertices L0, L1, B, A (renamed from vertices P26, P34, P29, P28) and area portion characterized by vertices L1, L3, D, C (renamed from vertices P34, P27, P24, P36) with another longitudinal line-segment $\overline{P1L2}$, around blockage area 1405, in accordance with one embodiment of the present invention. Referring simultaneously to FIGS. 22 and 23, layout 2300 includes the same elements and functions as layout 2200 with the following exceptions. The tool separately determines how transverse line segments $\overline{AB}$, $\overline{CD}$ correspond to which sub-template. Transverse line segment $\overline{AB}$ corresponds to transverse line segment $\overline{L0L1}$ since there are no other blockage vertices. Transverse line segment $\overline{CD}$ corresponds to transverse line segment $\overline{L1L3}$ since there are no other blockage vertices. For $\overline{AB}$, $\overline{CD}$ the tool follows Procedure #2.2 to determine the location for vertex P1 such that the ratio $\overline{CP1}:\overline{P1D}=1:1$, for this example. The three resulting sub-tiles are assigned to the three sub-templates 2105, 2115, 2120 as depicted by the fill patterns described above.

Figure 24:
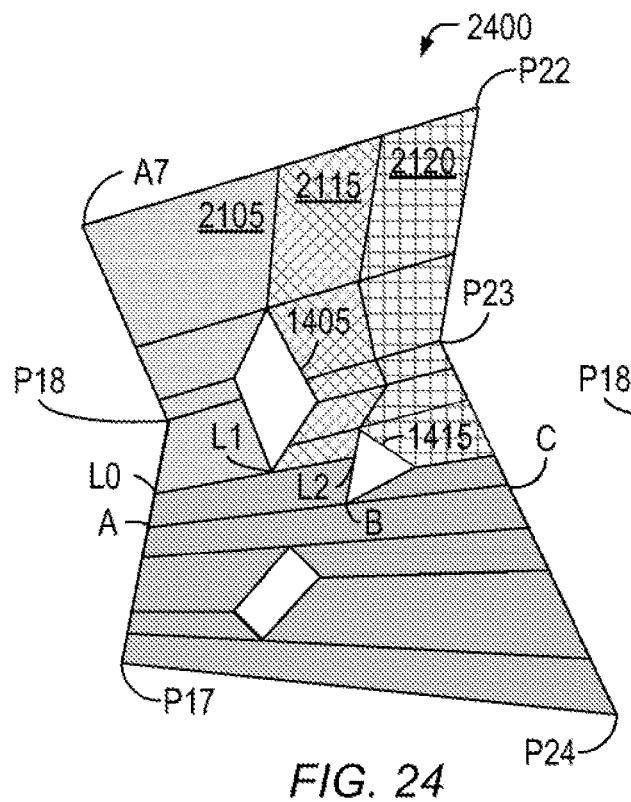
FIG. 24 depicts the simplified exemplary layout of the layout previously depicted in FIG. 23 after further dividing the tiles with a multitude of longitudinal line-segments around a second blockage and a third remarking, in accordance with one embodiment of the present invention.

FIG. 24 depicts the simplified exemplary layout 2400 of the layout 2300 previously depicted in FIG. 23 after further dividing tiles 1430, 1435 with a multitude of longitudinal line-segments around second blockage area 1415, in accordance with one embodiment of the present invention. Referring simultaneously to FIGS. 23 and 24, layout 2400 includes the same elements and functions as layout 2300 with the following exceptions. The tool continues to iteratively select transverse line segments repeating procedures #2.1, #2.2, #2.3, generating new longitudinal line segments and assigning the resulting sub-tiles to the three sub-templates 2105, 2115, 2120 depicted with the fill codes described above down to transverse segments having vertices L0, L1, L2. Transverse line segments $\overline{AB}$, $\overline{BC}$ have been selected for evaluation. The three sub-templates 2105, 2115, 2120 avoid blockage area 1405 and starting to go around blockage area 1415.

Figure 25:
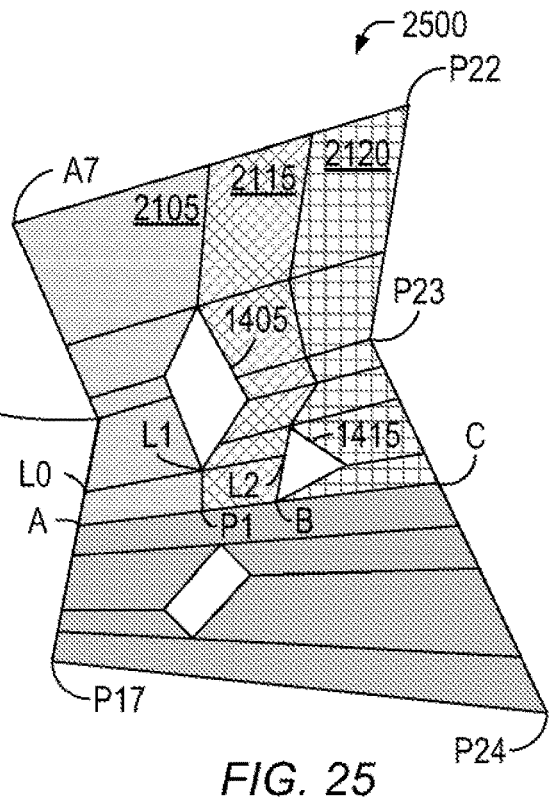
FIG. 25 depicts the simplified exemplary layout of the layout previously depicted in FIG. 24 after further dividing the tiles with one of a multitude of longitudinal line-segments around the second blockage, in accordance with one embodiment of the present invention.

FIG. 25 depicts the simplified exemplary layout 2500 of the layout 2400 previously depicted in FIG. 24 after further dividing tiles 1430, 1435 with one of a multitude of longitudinal line-segments $\overline{P1L1}$ around second blockage 1415, in accordance with one embodiment of the present invention. Referring simultaneously to FIGS. 24 and 25, layout 2500 includes the same elements and functions as layout 2400 with the following exceptions. The tool continues to iteratively select transverse line segments repeating procedures #2.1, #2.2, #2.3, generating new longitudinal line segments and assigning the resulting sub-tiles to the three sub-templates 2105, 2115, 2120 depicted with the fill codes described above down to transverse segments having vertices A, P1, B, C. The three sub-templates 2105, 2115, 2120 avoid blockage area 1405 and blockage area 1415 such that no sub-template includes any blockage areas.

Figure 26:
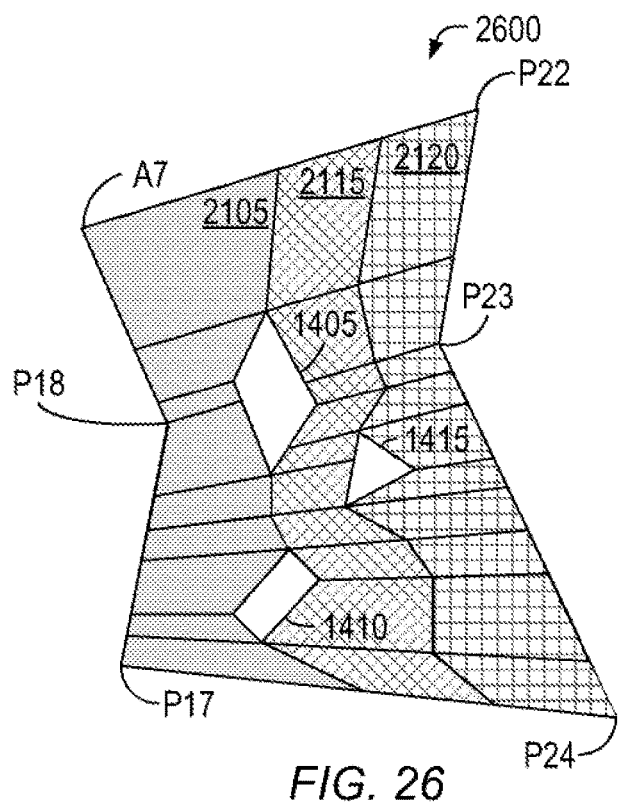
FIG. 26 depicts the simplified exemplary layout of the layout previously depicted in FIG. 25 after finishing dividing the tiles into three sub-templates, in accordance with one embodiment of the present invention.

FIG. 26 depicts the simplified exemplary layout 2600 of layout 2500 previously depicted in FIG. 25 after finishing dividing tiles 1430, 1435 into three sub-templates 2105, 2115, 2120, in accordance with one embodiment of the present invention. Referring simultaneously to FIGS. 25 and 26, layout 2600 includes the same elements and functions as layout 2500 with the following exceptions. The tool has finished connecting all the small quadrangles or sub-tiles to form the specific sub-templates for tiles 1430, 1435 while ensuring that no sub-template contains any blockage areas 1405, 1415, 1410.

Figure 27:
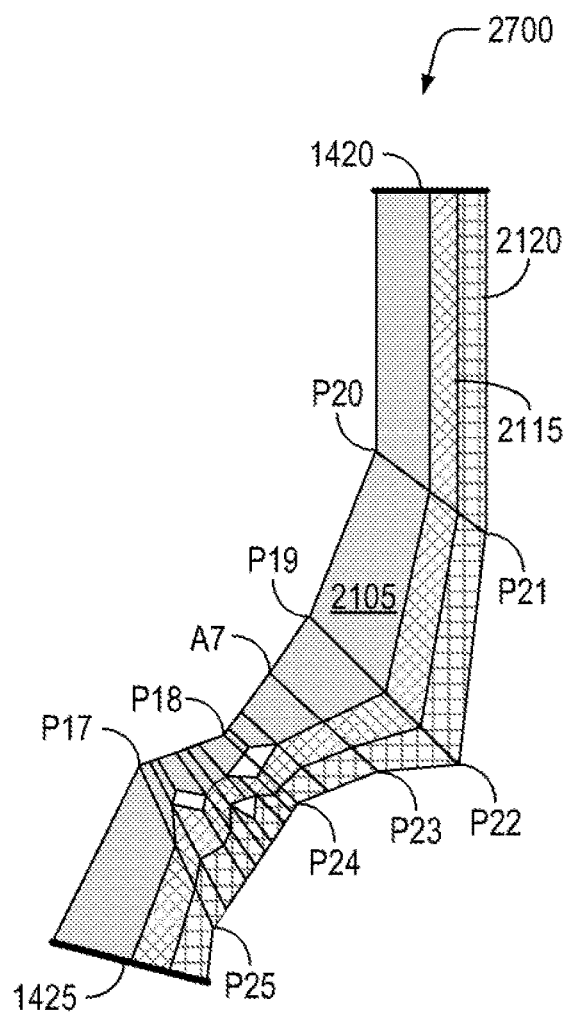
FIG. 27 depicts the simplified exemplary layout of the third routing area previously depicted in FIG. 15 after dividing the third routing area into three sub-templates, in accordance with one embodiment of the present invention.

FIG. 27 depicts the simplified exemplary layout 2700 of the layout 1500 previously depicted in FIG. 15 after dividing layout 15 into three sub-templates 2105, 2115, 2120, in accordance with one embodiment of the present invention. Referring simultaneously to FIGS. 2, 15, 26 and 27, layout 2700 includes the same elements and functions as layout 1500 and layout 2600 with the following exceptions. If step 220 determines that sub-routing templates are to be made then the tool decomposes 230 the routing area, e.g. layout 1500, into a multitude of sub-routing templates 2105, 2115, 2120 each not including any of the one or more blockage areas 1405, 1415, 1410. The tool has finished connecting all the small quadrangles or sub-tiles in all the original tiles of layout 1500 to form the specific sub-templates for tiles 1430, 1435 while ensuring that no sub-template contains any blockage areas 1405, 1415, 1410.

Figure 28:
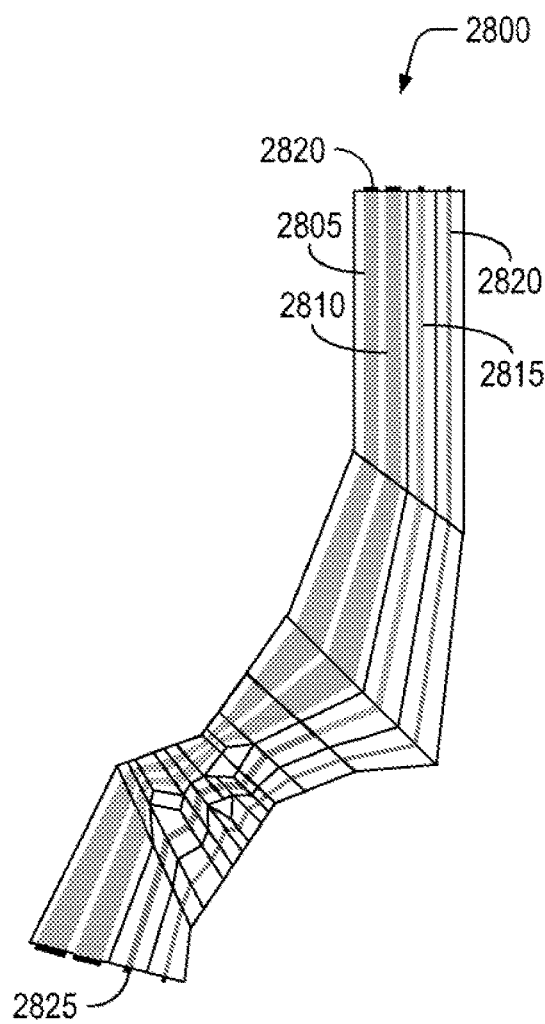
FIG. 28 depicts the simplified exemplary layout of the layout previously depicted in FIG. 27 after routing with a multitude of conductors using to the three sub-templates, in accordance with one embodiment of the present invention.

FIG. 28 depicts the simplified exemplary layout 2800 of the layout 2700 previously depicted in FIG. 27 after routing with a multitude of conductors 2805, 2810, 2815, 2820 using the three sub-templates 2105, 2115, 2120, in accordance with one embodiment of the present invention. Referring simultaneously to FIGS. 2, 15, 27 and 28, layout 2800 includes the same elements and functions as layout 1500 and layout 2800 with the following exceptions. After the decomposition step 230, the tool performs 235 a gateway model routing (GMR) of at least one conductor 2805, 2810, 2815, 2820 in each of the sub-routing templates 2105, 2115, 2120 using in-part the original vertices and the added one or more auxiliary vertices A7. The routing also uses the multitude of new transverse and longitudinal line segments described above. All the transverse line segments are used as gateways.

The original routing area has been balanced automatically using auxiliary vertex A7. Further, each sub-routing template may be assigned different routing parameters. For example, sub-routing templates 2105 has been set up to automatically route two conductors 2805, 2810 from start teeth 1420, which include start tooth 2820, to end teeth 1425. Conductors 2805, 2810 are the widest conductors in the GMR for layout 2800. At the same time, sub-routing template 2115 has been set up to automatically route one medium width conductor 2815 from start teeth 1420 to end teeth 1425, which include end tooth 2825. Simultaneously, sub-routing templates 2120 has been set up to automatically route one narrow width conductor 2820 from start teeth 1420 to end teeth 1425. Accordingly the problem of routing around blockage areas 1405, 1415, 1410 has been solved since each of the sub-routing templates 2105, 2115, 2120 exclude any blockage areas, while the user is enabled to specify different routing modes or constraints by individual sub-routing templates that are hierarchically under the original GMR template. The result is improved GMR routing flow and FPD layout productivity.

Optionally, if the original routing template is initially balanced at step 210, then the tool may perform the step to decompose 230 the routing area and then perform 245 the a gateway model routing (GMR) of at least one conductor in each of the sub-routing areas as described above but without using the auxiliary vertices needed to balance the routing template.

Figure 29:
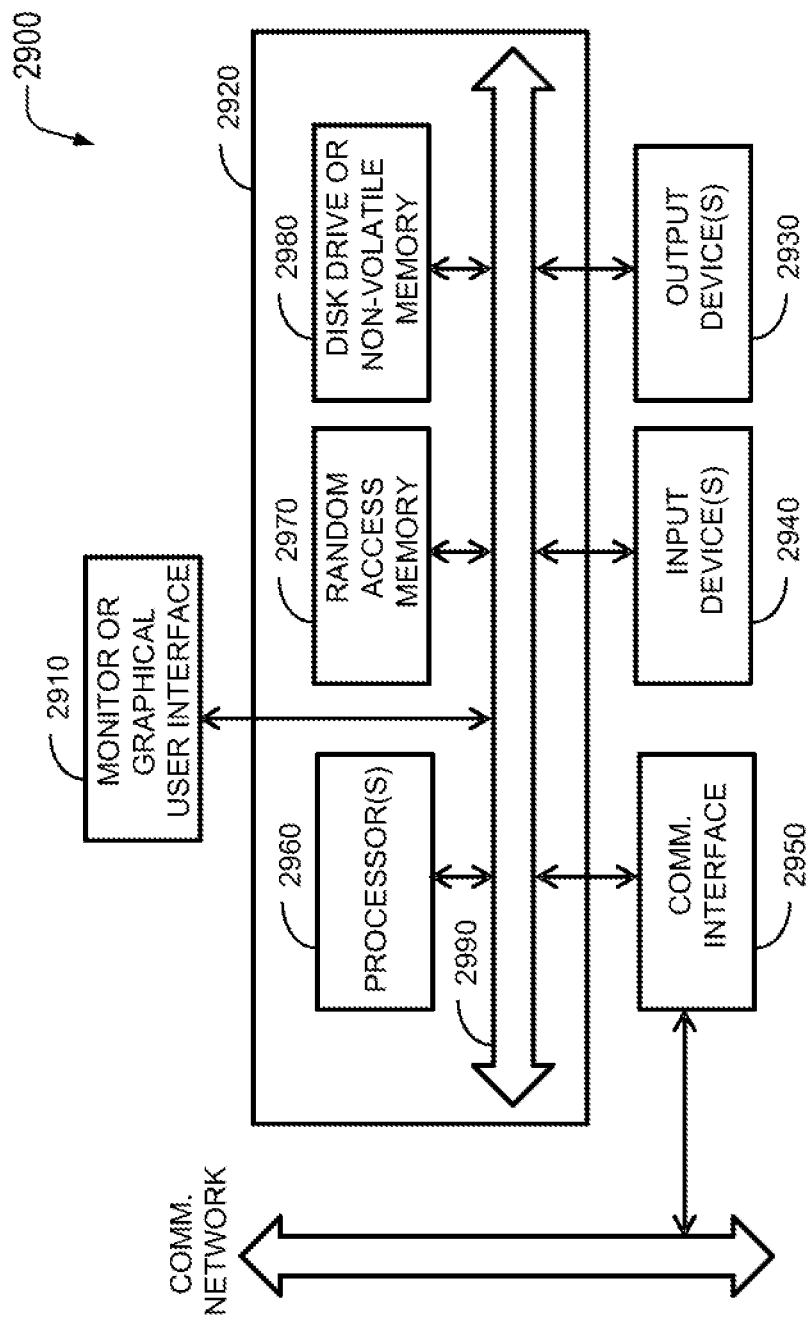
FIG. 29 is a block diagram of a computer system that may incorporate embodiments of the present invention.

FIG. 29 is a block diagram of a computer system that may incorporate embodiments of the present invention. FIG. 29 is merely illustrative of an embodiment incorporating the present invention and does not limit the scope of the invention as recited in the claims. One of ordinary skill in the art would recognize other variations, modifications, and alternatives.

In one embodiment, computer system 2900 typically includes a monitor 2910, a computer 2920, user output devices 2930, user input devices 2940, communications interface 2950, and the like.

As shown in FIG. 29, computer 2920 may include a processor(s) 2960 that communicates with a number of peripheral devices via a bus subsystem 2990. These peripheral devices may include user output devices 2930, user input devices 2940, communications interface 2950, and a storage subsystem, such as random access memory (RAM) 2970 and disk drive 2980.

User input devices 2930 include all possible types of devices and mechanisms for inputting information to computer system 2920. These may include a keyboard, a keypad, a touch screen incorporated into the display, audio input devices such as voice recognition systems, microphones, and other types of input devices. In various embodiments, user input devices 2930 are typically embodied as a computer mouse, a trackball, a track pad, a joystick, wireless remote, drawing tablet, voice command system, eye tracking system, and the like. User input devices 2930 typically allow a user to select objects, icons, text and the like that appear on the monitor 2910 via a command such as a click of a button or the like.

User output devices 2940 include all possible types of devices and mechanisms for outputting information from computer 2920. These may include a display (e.g., monitor 2910), non-visual displays such as audio output devices, etc.

Communications interface 2950 provides an interface to other communication networks and devices. Communications interface 2950 may serve as an interface for receiving data from and transmitting data to other systems. Embodiments of communications interface 2950 typically include an Ethernet card, a modem (telephone, satellite, cable, ISDN), (asynchronous) digital subscriber line (DSL) unit, FireWire interface, USB interface, and the like. For example, communications interface 2950 may be coupled to a computer network, to a FireWire bus, or the like. In other embodiments, communications interfaces 2950 may be physically integrated on the motherboard of computer 2920, and may be a software program, such as soft DSL, or the like.

In various embodiments, computer system 2900 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 2920 includes one or more Xeon microprocessors from Intel as processor(s) 2960. Further, one embodiment, computer 2920 includes a UNIX-based operating system.

RAM 2970 and disk drive 2980 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. RAM 2970 and disk drive 2980 may be configured to store the basic programming and data constructs that provide the functionality of the present invention.

Software code modules and instructions that provide the functionality of the present invention may be stored in RAM 2970 and disk drive 2980. These software modules may be executed by processor(s) 2960. RAM 2970 and disk drive 2980 may also provide a repository for storing data used in accordance with the present invention.

RAM 2970 and disk drive 2980 may include a number of memories including a main random access memory (RAM) for storage of instructions and data during program execution and a read only memory (ROM) in which fixed non-transitory instructions are stored. RAM 2970 and disk drive 2980 may include a file storage subsystem providing persistent (non-volatile) storage for program and data files. RAM 2970 and disk drive 2980 may also include removable storage systems, such as removable flash memory.

Bus subsystem 2990 provides a mechanism for letting the various components and subsystems of computer 2920 communicate with each other as intended. Although bus subsystem 2990 is shown schematically as a single bus, alternative embodiments of the bus subsystem may utilize multiple busses.

FIG. 29 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above embodiments of the present invention are illustrative and not limiting. Various alternatives and equivalents are possible. Although, the invention has been described with reference to three sub-templates by way of an example, it is understood that the invention is not limited by the number of sub-templates. Although, the invention has been described with reference to original templates having certain shapes by way of an example, it is understood that the invention is not limited by the shape of the original template. Although, the invention has been described with reference to blockage areas having certain shapes, position, or number by way of an example, it is understood that the invention is not limited by the shapes, position, or number of the blockage areas. Although, the invention has been described with reference to sub-templates having certain GMR constraints by way of an example, it is understood that the invention is not limited by the type of GMR constraints. In addition, the technique and system of the present invention is suitable for use with a wide variety of electronic design automation (EDA) tools and methodologies for designing, testing, and/or manufacturing systems characterized by a combination of conserved, signal flow, and event or digital system of equations. The scope of the invention should, therefore, be determined not with reference to the above description, but instead should be determined with reference to the pending claims along with their full scope or equivalents.

What is claimed is:

1. A computer implemented method for routing a plurality of conductors through a first routing area on a planar surface, the method comprising:
   receiving, by the computer, data representing the first routing area bounded by two opposite longitudinal sides each having a different number of a plurality of first vertices when the computer is invoked to perform the routing, wherein the first routing area includes one or more blockages;
   determining, by the computer, one or more locations on at least one of the two opposite longitudinal sides for adding one or more second vertices;
   decomposing, by the computer, the first routing area into a plurality of second routing areas each not including any of the one or more blockages; and
   performing, by the computer, a gateway model routing (GMR) of the plurality of conductors in each of the plurality of second routing areas using the plurality of first vertices and the added one or more second vertices.

2. The computer-implemented method of claim 1 further comprising:

transforming the data representing the first routing area so that each one of the two opposite longitudinal sides includes an equal number of the plurality of first vertices plus the number of the added one or more second vertices.

3. The computer-implemented method of claim 1, wherein each of the plurality of first vertices and each of the one or more second vertices are not disposed at an end of one of the two opposite longitudinal sides.

4. The computer-implemented method of claim 1 further comprising:
separating the plurality of first vertices into a first plurality of vertices disposed on a first side of the two opposite longitudinal sides and into a second plurality of vertices disposed on a second side of the two opposite longitudinal sides, the first side being disposed opposite the second side.

5. The computer-implemented method of claim 4 further comprising:
generating a first segment connected between one of the first plurality of vertices and one of the second plurality of vertices, wherein the first segment is associated with a minimum angle between the first segment and at least one edge of one of the two opposite longitudinal sides that adjoins the first segment.

6. The computer-implemented method of claim 4 further comprising:
generating a first segment connected between one of the first plurality of vertices and one of the second plurality of vertices, wherein the first segment is immediately neighboring one of the first plurality of vertices that is closest to one of the second plurality of vertices.

7. The computer-implemented method of claim 4 further comprising:
generating a first segment connected between one of the first plurality of vertices and one of the second plurality of vertices, wherein the first segment is defined by a length that is less than twice the distance between one of the first plurality of vertices that is closest to one of the second plurality of vertices.

8. The computer-implemented method of claim 4 further comprising:
generating a plurality of segments each one connected between a different pair of one of the first plurality of vertices and one of the second plurality of vertices;
finding at least one unconnected vertex of the plurality of first vertices that remains unconnected to any one of the plurality of segments previously generated, wherein the at least one unconnected vertex is disposed on the first side;
adding the one or more second vertices to the second side; and
generating a first segment connected between the at least one unconnected vertex and the one or more second vertices.

9. The computer-implemented method of claim 8, wherein the first segment is disposed between but not intersecting an immediately adjacent pair of the plurality of segments previously generated.

10. The computer-implemented method of claim 8, wherein the first segment is associated with a gateway in accordance with the GMR.

11. The computer-implemented method of claim 8, wherein the one or more locations for adding the one or more second vertices is disposed in accordance with a first ratio of the length of a first edge and the length of a second edge, wherein the at least one unconnected vertex is connected between the first edge and the second edge.

12. The computer-implemented method of claim 11, wherein the first ratio is equal to a second ratio of the length of a third edge and a length of a fourth edge, wherein the one or more second vertices is connected between the third edge and the fourth edge.

13. The computer-implemented method of claim 1, wherein the decomposing is performed in accordance with a predetermined characteristic associated with one of the plurality of conductors, wherein the plurality of conductors is associated with one of the plurality of second routing areas.

14. The computer-implemented method of claim 1, wherein the decomposing is performed in accordance with a predetermined ratio of a first length of a first transverse side of one of the plurality of second routing areas to a second length of a second transverse side of another one of the plurality of second routing areas, wherein the first transverse side and the second transverse side are collinear.

15. The computer-implemented method of claim 1, wherein one of the one or more blockages is defined by a first plurality of vertices, the method further comprising:
dividing a first portion of the first routing area in accordance with a position of at least one of the first plurality of vertices so as to form a transverse line segment that divides the first portion into a second portion and a third portion, wherein the transverse line segment does not cross through an interior of any of the one or more blockages.

16. The computer-implemented method of claim 15, wherein dividing the first portion of the first routing area forms a plurality of transverse line segments, wherein each one of the plurality of transverse line segments includes one point disposed at a different one of the first plurality of vertices, wherein none of the plurality of transverse line segments crosses through an interior of any of the one or more blockages.

17. The computer-implemented method of claim 15, wherein the first portion is bounded by a first transverse side and a second transverse side opposite the first transverse side, wherein the transverse line segment is disposed parallel to the first transverse side when the second transverse side is disposed parallel to the first transverse side.

18. The computer-implemented method of claim 15, wherein the first portion is bounded by a first transverse side and a second transverse side opposite the first transverse side, wherein when a first collinear extension of the first transverse side intersects a second collinear extension of the second transverse side at a first point, then the transverse line segment is disposed such that a third collinear extension of the transverse line segment intersects the first point.

19. The computer-implemented method of claim 15, wherein a portion of the transverse line segment is a gateway during the GMR.

20. The computer-implemented method of claim 15 further comprising:
dividing the second portion in accordance with one of the first plurality of vertices so as to form a longitudinal line segment that divides the second portion, wherein a first end of the longitudinal line segment is disposed at one of the first plurality of vertices.

21. The computer-implemented method of claim 15 further comprising:
dividing the second portion in accordance with a predetermined ratio of a first length of a first transverse side of one of the plurality of second routing areas to a second length of a second transverse side of another one of the plurality of second routing areas so as to form a longitudinal line segment that divides the second portion, wherein the first transverse side and the second transverse side are collinear.

22. A system for routing a plurality of conductors through a first routing area on a planar surface, the system configured to:
receive data representing the first routing area bounded by two opposite longitudinal sides each having a different number of a plurality of first vertices when the computer is invoked to perform the routing, wherein the first routing area includes one or more blockages;
determine one or more locations on at least one of the two opposite longitudinal sides for adding one or more second vertices;
decompose the first routing area into a plurality of second routing areas each not including any of the one or more blockages; and
perform a gateway model routing (GMR) of the plurality of conductors in the first routing area using the plurality of first vertices and the added one or more second vertices.

23. The system of claim 22 further configured to:
transform the data representing the first routing area so that each one of the two opposite longitudinal sides includes an equal number of the plurality of first vertices plus the number of the added one or more second vertices.

24. The system of claim 22, wherein each of the plurality of first vertices and each of the one or more second vertices are not disposed at an end of one of the two opposite longitudinal sides.

25. The system of claim 22 further configured to:
separate the plurality of first vertices into a first plurality of vertices disposed on a first side of the two opposite longitudinal sides and into a second plurality of vertices disposed on a second side of the two opposite longitudinal sides, the first side being disposed opposite the second side.

26. The system of claim 25 further configured to:
generate a first segment connected between one of the first plurality of vertices and one of the second plurality of vertices, wherein the first segment is associated with a minimum angle between the first segment and at least one edge of one of the two opposite longitudinal sides that adjoins the first segment.

27. The system of claim 25 further configured to:
generate a first segment connected between one of the first plurality of vertices and one of the second plurality of vertices, wherein the first segment is immediately neighboring one of the first plurality of vertices that is closest to one of the second plurality of vertices.

28. The system of claim 25 further configured to:
generate a first segment connected between one of the first plurality of vertices and one of the second plurality of vertices, wherein the first segment is defined by a length that is less than twice the distance between one of the first plurality of vertices that is closest to one of the second plurality of vertices.

29. The system of claim 25 further configured to:
generate a plurality of segments each one connected between a different pair of one of the first plurality of vertices and one of the second plurality of vertices;
find at least one unconnected vertex of the plurality of first vertices that remains unconnected to any one of the plurality of segments previously generated, wherein the at least one unconnected vertex is disposed on the first side;
add the one or more second vertices to the second side; and
generate a first segment connected between the at least one unconnected vertex and the one or more second vertices.

30. The system of claim 29, wherein the first segment is disposed between but not intersecting an immediately adjacent pair of the plurality of segments previously generated.

31. The system of claim 29, wherein the first segment is associated with a gateway in accordance with the GMR.

32. The system of claim 29, wherein the one or more locations for adding the one or more second vertices is disposed in accordance with a first ratio of the length of a first edge and the length of a second edge, wherein the at least one unconnected vertex is connected between the first edge and the second edge.

33. The system of claim 32, wherein the first ratio is equal to a second ratio of the length of a third edge and a length of a fourth edge, wherein the one or more second vertices is connected between the third edge and the fourth edge.

34. The system of claim 22, wherein to decompose is performed in accordance with a predetermined characteristic associated with one of the plurality of conductors, wherein the plurality of conductors is associated with one of the plurality of second routing areas.

35. The system of claim 22, wherein to decompose is performed in accordance with a predetermined ratio of a first length of a first transverse side of one of the plurality of second routing areas to a second length of a second transverse side of another one of the plurality of second routing areas, wherein the first transverse side and the second transverse side are collinear.

36. The system of claim 22, wherein one of the one or more blockages is defined by a first plurality of vertices, the system further configured to:
divide a first portion of the first routing area in accordance with a position of at least one of the first plurality of vertices so as to form a transverse line segment that divides the first portion into a second portion and a third portion, wherein the transverse line segment does not cross through an interior of any of the one or more blockages.

37. The system of claim 36, wherein to divide the first portion of the first routing area forms a plurality of transverse line segments, wherein each one of the plurality of transverse line segments includes one point disposed at a different one of the first plurality of vertices, wherein none of the plurality of transverse line segments crosses through an interior of any of the one or more blockages.

38. The system of claim 36, wherein the first portion is bounded by a first transverse side and a second transverse side opposite the first transverse side, wherein the transverse line segment is disposed parallel to the first transverse side when the second transverse side is disposed parallel to the first transverse side.

39. The system of claim 36, wherein the first portion is bounded by a first transverse side and a second transverse side opposite the first transverse side, wherein when a first collinear extension of the first transverse side intersects a second collinear extension of the second transverse side at a first point, then the transverse line segment is disposed such that a third collinear extension of the transverse line segment intersects the first point.

40. The system of claim 36, wherein a portion of the transverse line segment is a gateway during the GMR.

41. The system of claim 36 further configured to:
divide the second portion in accordance with one of the first plurality of vertices so as to form a longitudinal line segment that divides the second portion, wherein a first end of the longitudinal line segment is disposed at one of the first plurality of vertices.

42. The system of claim 36 further configured to:
divide the second portion in accordance with a predetermined ratio of a first length of a first transverse side of one of the plurality of second routing areas to a second length of a second transverse side of another one of the plurality of second routing areas so as to form a longitudinal line segment that divides the second portion, wherein the first transverse side and the second transverse side are collinear.

* * * * *